United States Patent [19]

Katsuyama et al.

[11] Patent Number: 5,416,549
[45] Date of Patent: May 16, 1995

[54] LENS MOUNT FOR VIDEO CAMERA

[75] Inventors: Tomoyasu Katsuyama, Kanagawa; Naoki Sano, Tokyo, all of Japan

[73] Assignee: Sony Corporation, Japan

[21] Appl. No.: 203,568

[22] Filed: Mar. 1, 1994

[30] Foreign Application Priority Data

Mar. 5, 1993 [JP] Japan .................................. 5-045184
Feb. 17, 1994 [JP] Japan .................................. 6-019728

[51] Int. Cl.⁶ .......................................... G03B 17/00
[52] U.S. Cl. .................................. 354/286; 359/811; 359/819
[58] Field of Search ................ 354/286; 359/703, 704, 359/811, 819, 827, 828, 829, 830; 348/374, 375

[56] References Cited

U.S. PATENT DOCUMENTS 5,357,299 10/1994 Cheeseman ..................... 354/286 X Primary Examiner—Howard B. Blankenship
Attorney, Agent, or Firm—Ronald P. Kananen

[57] ABSTRACT

A lens mount device for detachably mounting a lens cylinder having a cylindrical outer surface, on a video camera body which has an optical axis passing therethrough. The lens mount device includes a base plate formed with a circular opening having an axis aligned with the optical axis. A base ring is secured to the base plate and formed with a cylindrical opening coaxial with the circular opening of the base plate to receive the lens cylinder. A slide ring is axially movably disposed within the base ring and formed with an inner surface. The slide ring has a first position where its inner surface is engaged with the outer surface of the lens cylinder and a second position where its inner surface is disengaged from the outer surface of the lens cylinder, when the lens cylinder is mounted on the base ring. The slide ring has cam pins engageable with a cam groove of a cam ring connected with an actuator ring. The actuator ring is rotatably disposed on said base ring and axially movable with respect to the optical axis. The rotating and axial movement of the actuator ring causes the slide ring to move into the first and second positions in association with the cam ring.

20 Claims, 31 Drawing Sheets

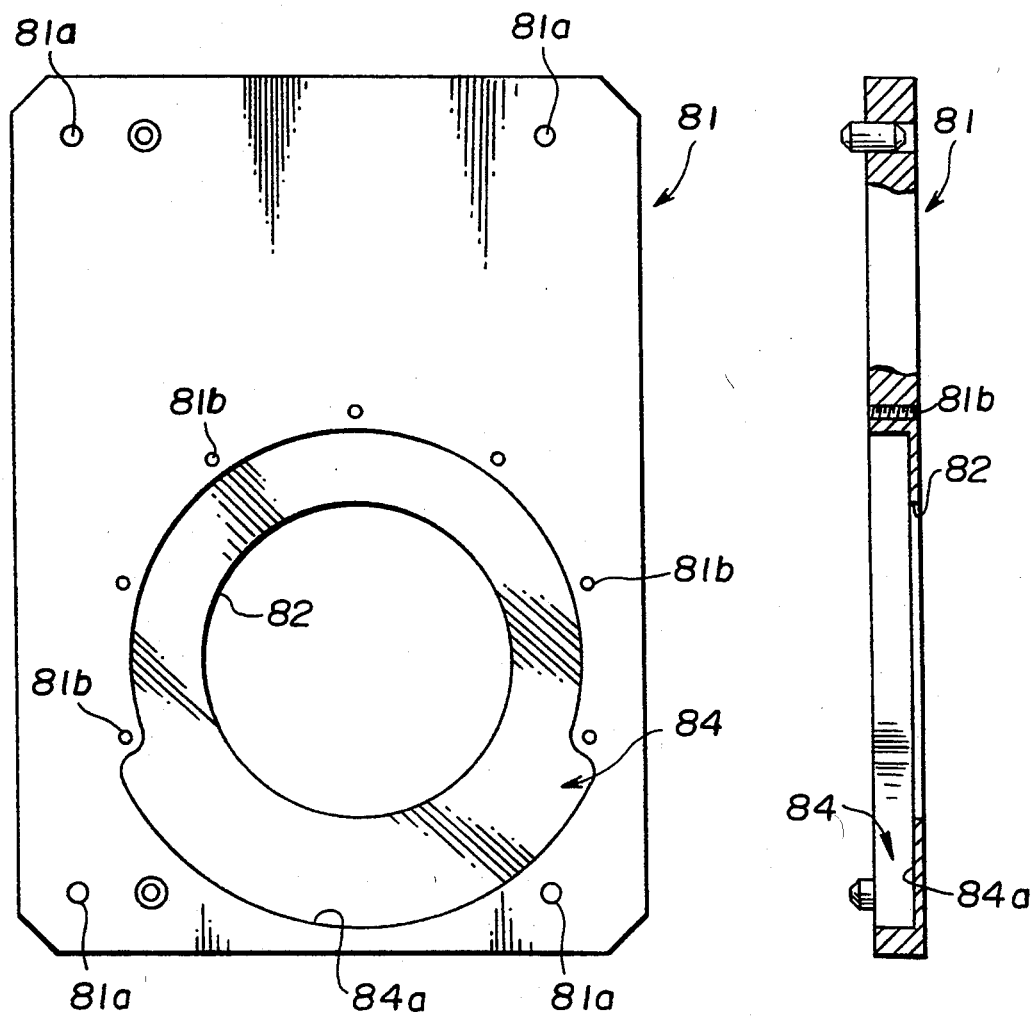

FIG.15
FIG.16
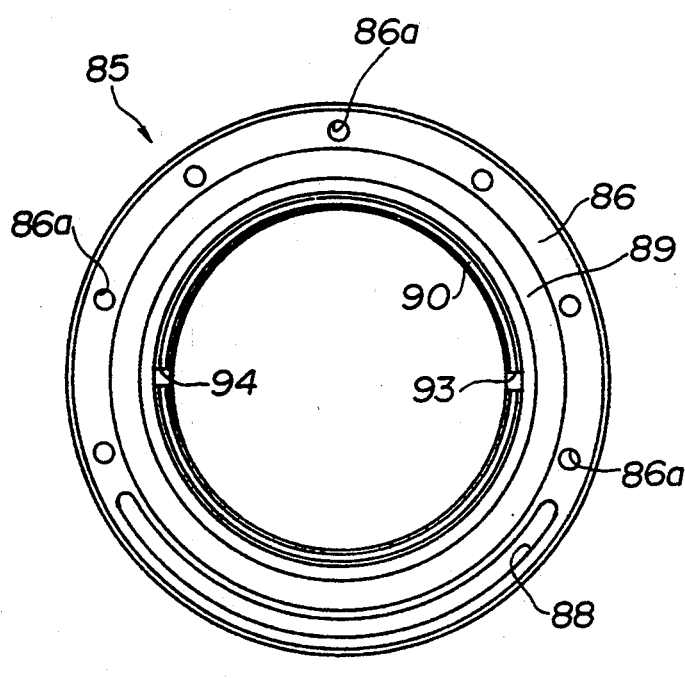
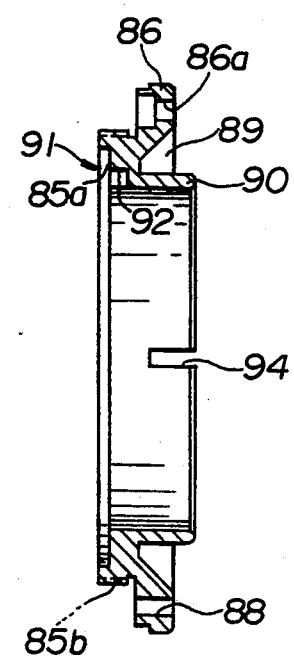

FIG.41 FIG.42
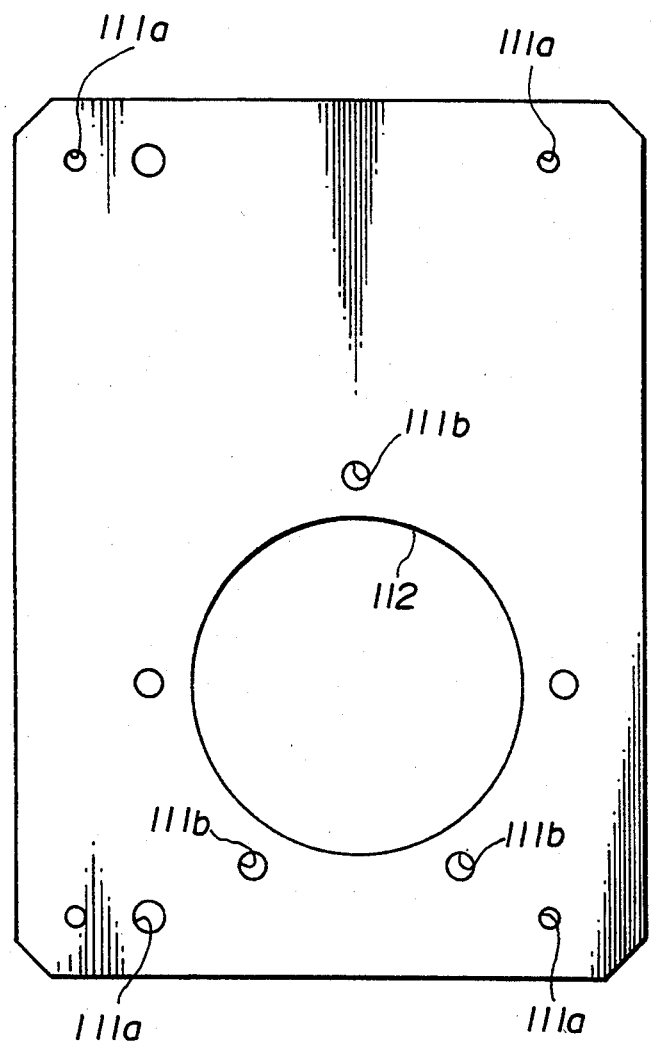
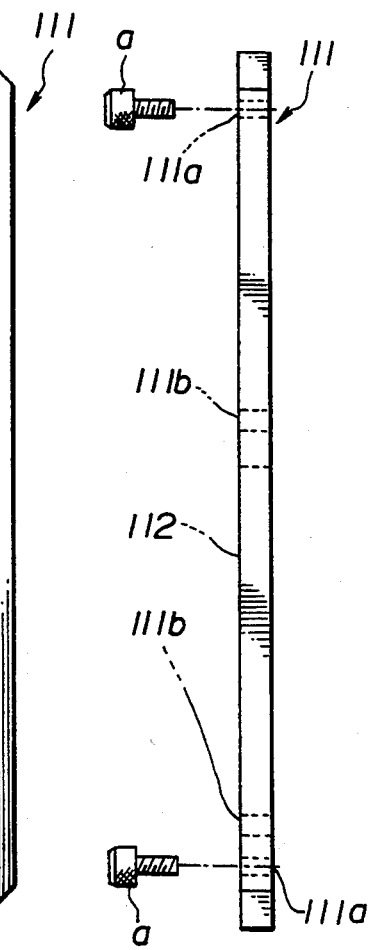

LENS MOUNT FOR VIDEO CAMERA

BACKGROUND OF THE INVENTION

The present invention relates to a video camera, and more specifically to a lens mount device for a video camera body through which lenses of different types are detachably mounted on the video camera.

Many video cameras are provided with a lens mount mechanism for mounting a lens on a body of the video camera.

One example of the lens mount mechanism is of a bayonet type which is primarily adapted for video cameras of a portable type and by which a portable size lens is detachably mounted on a body of the portable video camera. The bayonet type of the lens mount mechanism is formed with a circular opening. A first engaging member is formed on the portable size lens. An actuator ring is disposed on the lens mount mechanism in coaxial relation to the circular opening and formed with a second engaging member engageable with the first engaging member. The actuator ring allows engagement and disengagement of the first and second engaging members such that the portable size lens is fittingly received in and released from the opening.

Another example of the lens mount mechanism is of a hanger type which is primarily adapted for large size video cameras such as those for broadcasting and by which a large size lens is detachably mounted on a body of the large size video camera. The hanger type of the lens mount mechanism includes a first engaging member disposed on the camera body and a second engaging member disposed on the large size lens. The first and second engaging members are engaged with each other whereby the large size lens is mounted on the camera body.

Meanwhile, there is increased needs that the portable size lens is mountable onto the large size video camera body or reversely a larger size lens onto a portable video camera body. To meet such needs, especially when the large size lens is coupled with a portable video camera body, a lens support is used. The large size lens is mounted in a hanging manner on the lens support so that an engaging member of the large size lens comes into engagement with an engaging member disposed on the lens support. The portable video camera body is supported on a camera support disposed on the lens support. The camera support is adjustable in height such that an optical axis of the portable video camera body is aligned with that of the large size lens at a predetermined level of height.

Using such a lens support, the mounting and dismounting operations of the large size lens on and from the portable video camera body is performed. However, such operations are not easy due to interference between respective circumferential edges of the large size lens and actuator ring of the portable video camera body.

There also is a demand to provide a lens mount device by which the large size lens can be readily detachably mounted on the portable video camera body and the portable size lens can be mounted on the large size video camera body.

SUMMARY OF THE INVENTION

An object of the present invention is to provide a lens mount device in which mounting and dismounting operations of a portable size lens on a large size video camera and of a large size lens on a portable video camera are readily carried out.

According to the present invention, there is provided a lens mount device for detachably mounting a lens cylinder on optical apparatus which has an optical axis passing therethrough, the lens cylinder having a cylindrical outer surface, comprising:

- a base plate having a circular opening having an axis aligned with the optical axis;
- a base ring secured to the base plate and formed with a cylindrical opening coaxial with the circular opening of the base plate to receive the lens cylinder;
- a movable member movably disposed within the base ring and formed with an inner surface, the movable member having a first position where the inner surface of the movable member is engaged with the outer surface of the lens cylinder and a second position where the inner surface of the movable member is disengaged from the outer surface of the lens cylinder, when the lens cylinder is mounted on the base ring, the movable member having a cam follower thereon;
- a cam member engageable with the cam follower; and
- an actuator ring rotatably disposed on the base ring and axially movable with respect to the optical axis, the actuator ring being connected with the cam member, the rotating and axial movement of the actuator ring causing the movable member to move into the first and second positions in association with the cam member.

BRIEF DESCRIPTION OF THE DRAWINGS

FIG. 11 is a front elevation of a base used in the lens mount device of FIG. 7;

FIG. 12 is a side view, partially broken away, of the base of FIG. 11;

FIG. 15 is a rear elevation of the base ring of FIG. 13;

FIG. 16 is a cross-sectional view of the base ring of FIG. 15;

FIG. 41 is a front elevation of a base used in the lens mount device of FIG. 40;

FIG. 42 is a side view of the base of FIG. 41;

DESCRIPTION OF THE PREFERRED EMBODIMENT

Figure 1:
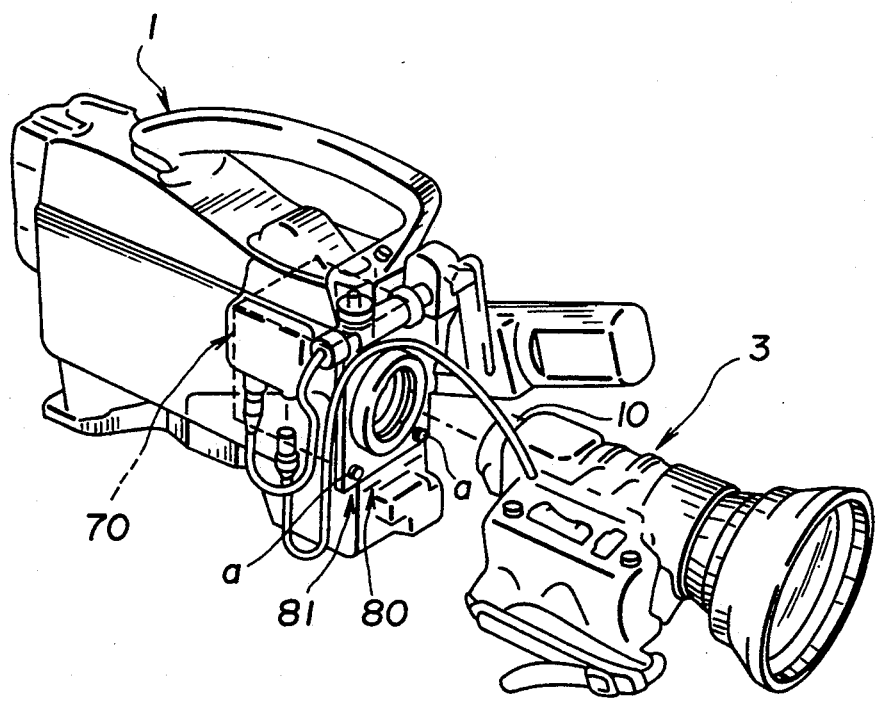
FIG. 1 is a perspective view of a portable video camera to which a lens mount device according to the present invention is applied, and which shows a portable video camera body and a portable size lens detachably coupled therewith.
Figure 2:
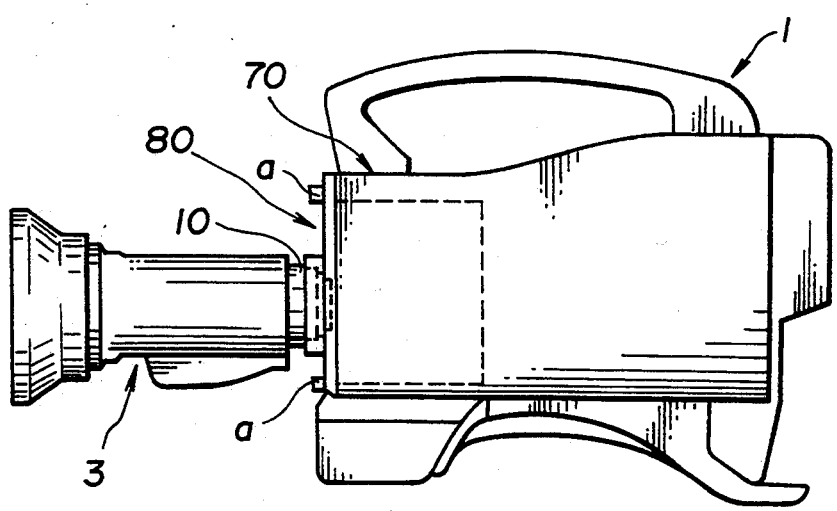
FIG. 2 is a side view of the portable video camera of FIG. 1.

Referring now to FIGS. 1 and 2, there is shown a portable video camera to which a lens mount device 80 according to the present invention is applied. As shown in FIGS. 1 and 2, the portable video camera includes a generally box-shaped camera body 1 in which a casing 70 for accommodating elements such as prism, CCD or the like therein are disposed. The lens mount device 80 includes a base 81 which is attached to the camera body 1 by means of screws as indicated at 'a' in FIGS. 1 and 2. Detachably coupled with the lens mount device 80 is a mount portion 10 of a generally cylindrical portable size lens 3 as seen in FIGS. 1 and 2.

Figure 3:
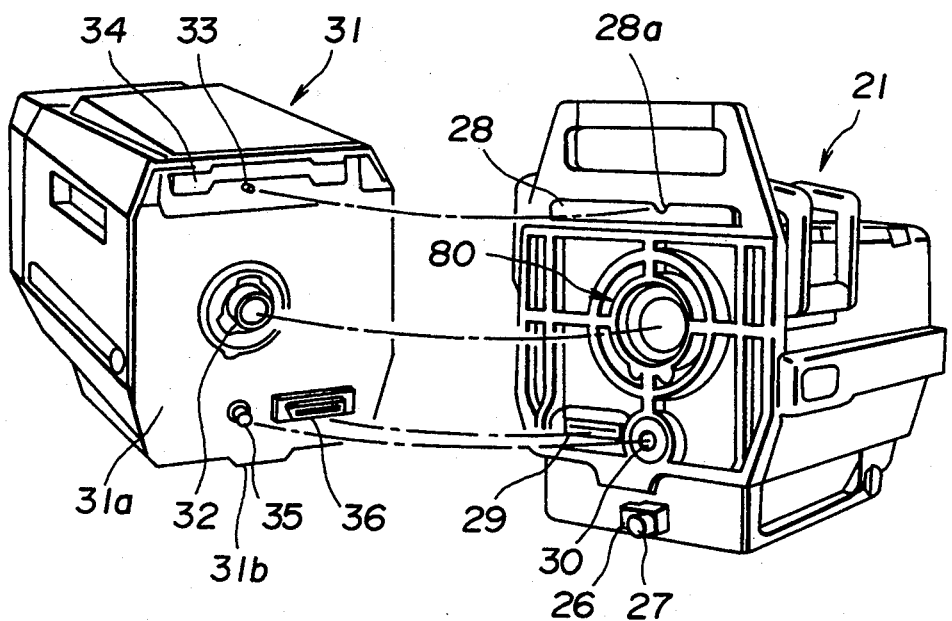
FIG. 3 is a perspective view of a large size video camera showing a large size video camera body and a large size lens detachably coupled therewith.

Referring to FIG. 3, there is shown a large size video camera adapted for professional use such as broadcasting, to which the lens mount device 80 according to the present invention is applied.

Figure 4:
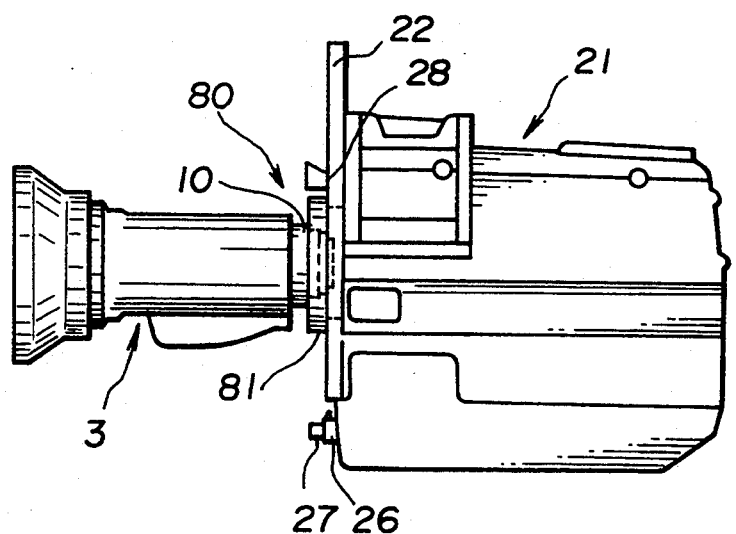
FIG. 4 is a side view of the large size video camera body and the portable size lens detachably coupled therewith.

As shown in FIG. 3, the large size video camera includes a generally-box-shaped camera body 21 and a large size lens 31 fitable to the camera body 21. As seen in FIGS. 3 and 4, a bar-shaped wedge 28 is disposed on an upper portion of one end wall, viz. front wall 22 of the camera body 21. The wedge 28 extends laterally between left and right edges as viewed in FIG. 3, of the front wall 22 and projects outwardly from the front wall 22. As seen in FIG. 3, the wedge 28 is engageable with a wedge 34 disposed on one end wall, viz. rear wall 31a of the large size lens 31. As shown in FIG. 3, a pin 33 is disposed adjacent the wedge 34 on the rear wall 31a to be engageable with a groove 28a formed on the wedge 28 on the front wall 22 of the camera body 21. As shown in FIG. 3, a recess 30 is formed on a lower portion of the front wall 22 of the camera body 21. Engageable in the recess 30 is a pin 35 which is disposed on the rear wall 31a of the large size lens 31. Numeral 26 denotes a rotary engaging member engageable with an engaging member 31b which is formed on a lower edge of the rear wall 31a of the large size lens 31 as shown in FIG. 3. Numeral 27 denotes an operating member disposed on the rotary engaging member 26 to rotate manually the rotary engaging member 26 for engagement with the engaging member 31b. The engagement of the wedges 28 and 34, the pin 33 and groove 28, the pin 35 and recess 30, and the engaging members 26 and 31b, cooperate to ensure coupling of the large size lens 26 with the camera body 20. Numerals 29 and 36 denote a pair of connectors which are disposed on the front wall 22 off the camera body 21 and the rear wall 31a of the large size lens 31, respectively.

As shown in FIG. 4, the lens mount device 80 includes the base 81 which is secured to the large size video camera body 21, for example, by means of screws (not shown). Detachably coupled with the lens mount device 80 is a mount portion 10 of the portable size lens 3 as seen in FIG. 4. The mount portion 10 is opposed to a mount base 81 of the lens mount device 80 when the large size lens 31 is mounted on the camera body 21.

Figure 5:
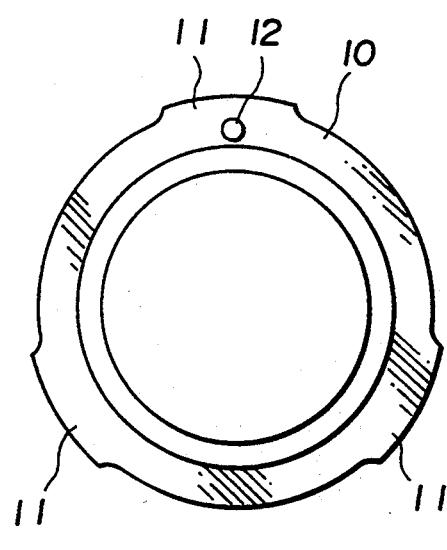
FIG. 5 is a front elevation of the portable size lens.
Figure 6:
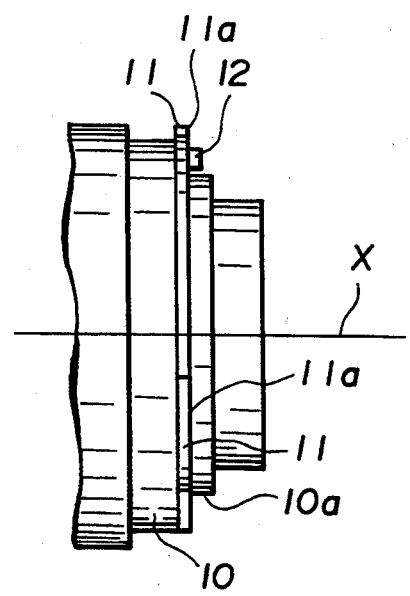
FIG. 6 is a side view of the portable size lens of FIG. 4.

Referring to FIGS. 5 and 6, the mount portion 10 of the portable size lens 3 includes a small diameter section formed with an outer circumferential surface 10a, and a large diameter section, which are concentrically disposed with respect to an optical axis X. As seen in FIG. 5, three integral flanges 11 are formed in an equidistantly and circumferentially spaced relation on a peripheral edge of the large diameter section and extend outward therefrom. As best shown in FIG. 6, a pin 12 is disposed on an end face 11a of the large diameter section which is disposed normally relative to the optical axis X adjacent the outer circumferential surface 10a. The mount portion 32 of the large size lens 31 has substantially same contour as one of the mount portion 10 of the portable size lens 3. As seen in FIGS. 35–39, the mount portion 32 includes an outer circumferential surface 32A of a small diameter section, integral flanges 32S, an end face 32C of a large diameter section normally extending relative to the optical axis X, and a pin 82D disposed on the end face 32C.

Figure 7:
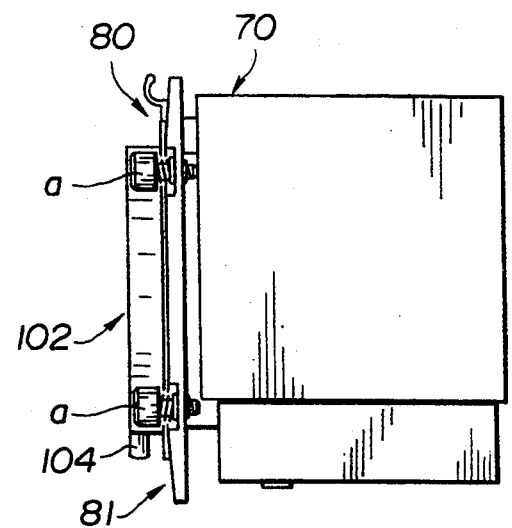
FIG. 7 is a top plan view of the lens mount device of a first embodiment according to the present to invention.
Figure 8:
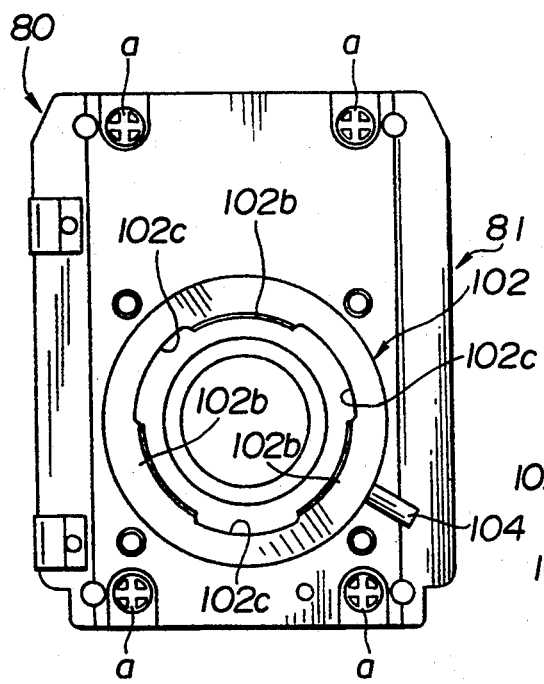
FIG. 8 is a front elevation of the lens mount device of FIG. 7.
Figure 9:
FIG. 9 is a side view of the lens mount device of FIG. 7.
Figure 10:
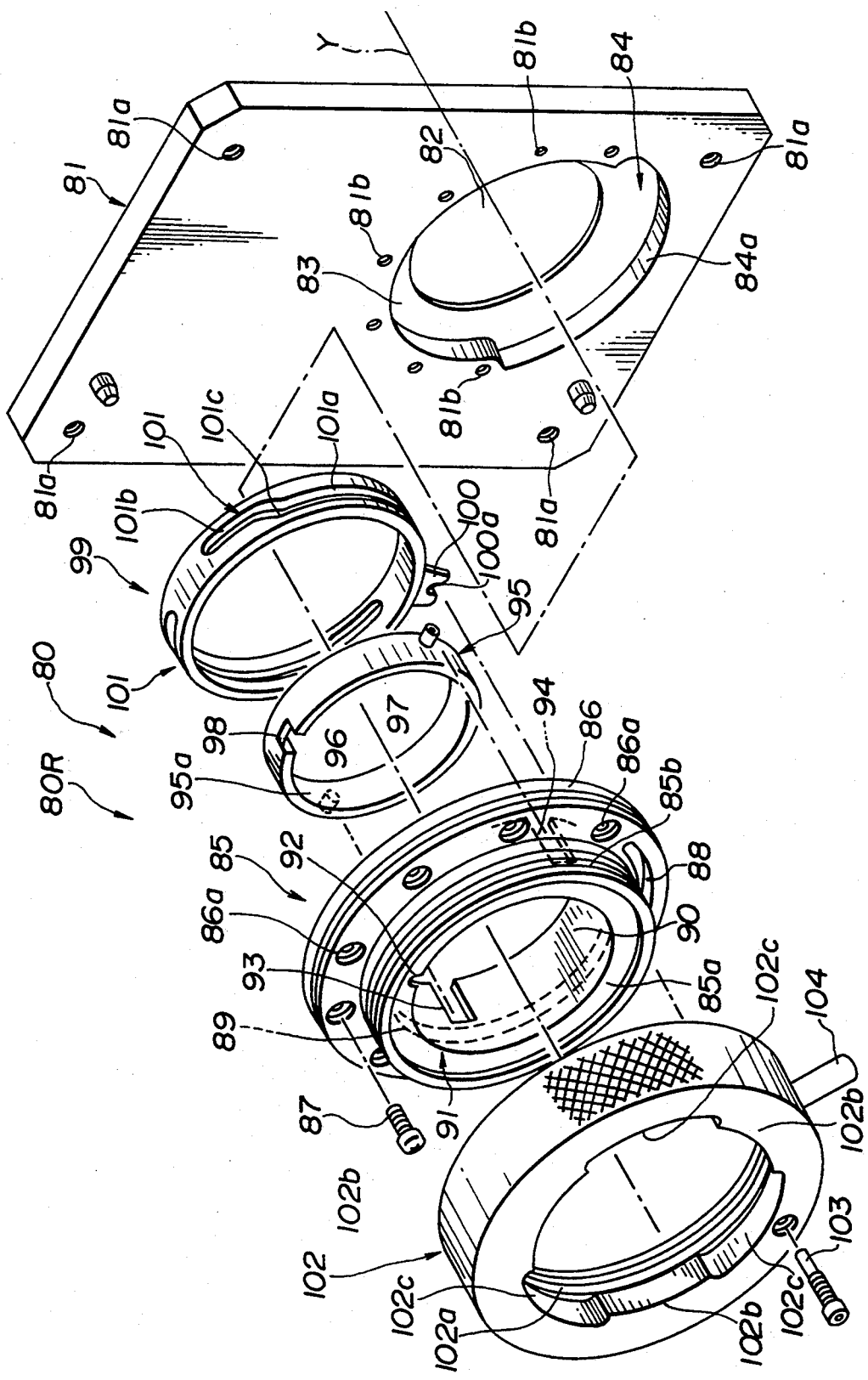
FIG. 10 is an exploded perspective view of the lens mount device of FIG. 7.

Referring to FIGS. 7–32, the lens mount device 80 according to the present invention will now be described in detail. FIGS. 7–9 show the lens mount device 80 including the base 81 which is mounted on the portable video camera body and disposed adjacent the casing 70. FIG. 10 shows the base 81 and a ring assembly 80R disposed on the base 81.

As seen in FIGS. 10–12, the base 81 is of a generally rectangular shape and formed with holes 81a through which the fastening screws 'a' are inserted. As shown in FIGS. 10–12, the base 81 has a circular opening 82 having an axis Y aligned with an optical axis of the portable video camera body or large size video camera body. The base 81 is formed with an integral annular flange 83 having a smaller thickness than that of the remaining part of the base 81. The integral annular flange 83 has one end face flush with an end face of the base 81 on the same end side and extends radially inward from a circumferential edge of the opening 82 to reduce an area of the opening 82. The integral flange 83 also defines an annular recess disposed on the other end face of the base 81. The recess includes a sectorial portion 84 which is formed at an angle of 120 degrees with respect to the opening 82. Disposed equidistantly around the opening 82 are a plurality of holes 81b as seen in FIGS. 10–11.

Figure 13:
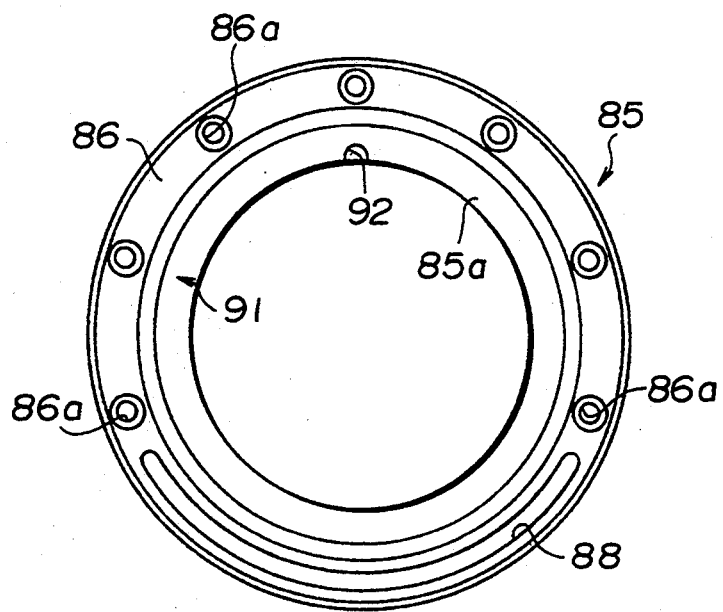
FIG. 13 is a front elevation of a base ring used in the lens mount device of FIG. 7.

As shown in FIG. 10, the ring assembly 80R is concentrically disposed with respect to the axis Y and includes a base ring 85, a slide ring 95, a cam ring 99, and an actuator ring 102. The base ring 85 includes a cylindrical body portion and an integral flange 86 extending radially outward from the body portion. The flange 86 is opposed to the peripheral portion around the opening 82 of the base 81. As seen in FIGS. 10, 13, 15 and 16, a plurality of holes 86a are disposed on the flange 86 in an equidistantly spaced relation. The base ring 85 is secured at the flange 86 to the base 81 by means of a fastening screw 87 as shown in FIG. 10 which is screwed via the holes 86a into the holes 81b. As best shown in FIGS. 13 and 15, an arcuate opening 88 is formed on the flange 86 in opposed relation to the sectorial portion 84 of the recess of the base 81.

Figure 14:
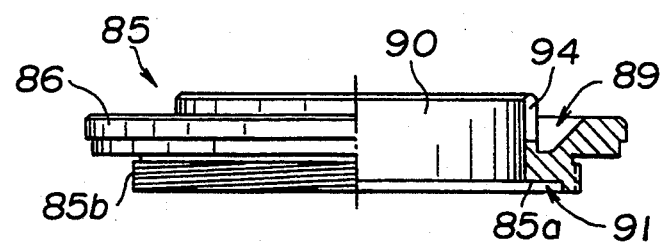
FIG. 14 is a side view, partially in section, of the base ring of FIG. 13.

As seen in FIGS. 10, 13, 14 and 16, the cylindrical body portion of the base ring 85 is formed with an annular recess 91 on its one end face which is opposed to an actuator ring 102 as shown in FIG. 10. The provision of the annular recess 91 forms an annular end face 85a engageable with the end face 11a of the flange 11 of the mount portion 10 of the portable size lens 8 or the mount portion 82 of the large size lens 31. As best shown in FIGS. 10 and 13, a groove 92 engageable with the pin 12 of the mount portion 10 of the portable size lens 3 is disposed on an uppermost inner peripheral edge of the recessed portion 91. As seen in FIGS. 10, 14 and 16, disposed on an outer circumferential surface of the cylindrical body portion is a threaded portion 85b with which the actuator ring 102 is threadedly engageable. The cylindrical body portion also is formed with a groove 89 to define an annular wall 90 as shown in FIGS. 10, 14, 15 and 16. The annular wall 90 is received in the recess defined by the integral flange 83 of the base 81.

Axially slidably disposed within a center opening of the base ring 85 with respect to the axis of the base ring 85 is the slide ring 95 as shown in FIGS. 10 and 17–19. The slide ring 95 has a first position where an inner circumferential surface 95a of the slide ring 95 is engaged with the outer circumferential surface 10a of the mount portion 10 of the portable size lens 3. Thus, the slide ring 95 is interposed between an inner circumferential surface of the base ring 85 and the outer circumferential surface 10a of the mount portion 10 of the portable size lens 3. The slide ring 95 has a second position where an outer circumferential surface of the slide ring 95 is disengaged from the outer circumferential surface 10a of the mount portion 10 of the portable size lens 3.

Figure 18:
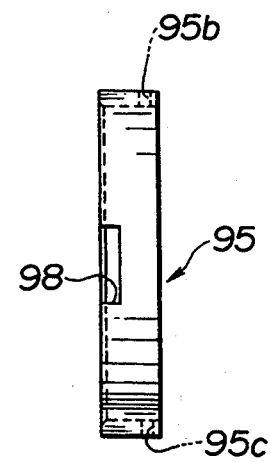
FIG. 18 is a front elevation of the slide ring of FIG. 17.
Figure 19:
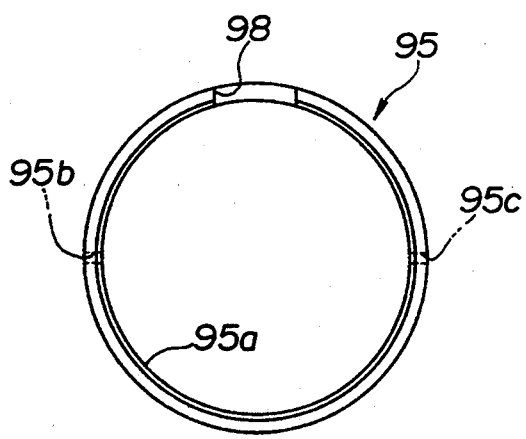
FIG. 19 is a cross-sectional view of the slide ring of FIG. 18.
Figure 17:
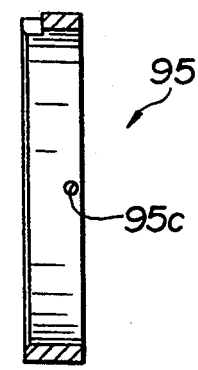
FIG. 17 is a top plan view of a slide ring used in the lens mount device of FIG. 7.
Figure 21:
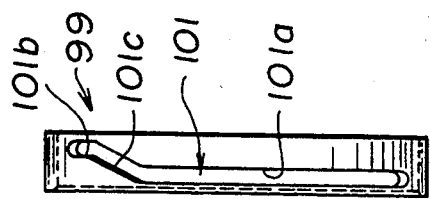
FIG. 21 is a side view of the cam ring of FIG. 20.
Figure 20:
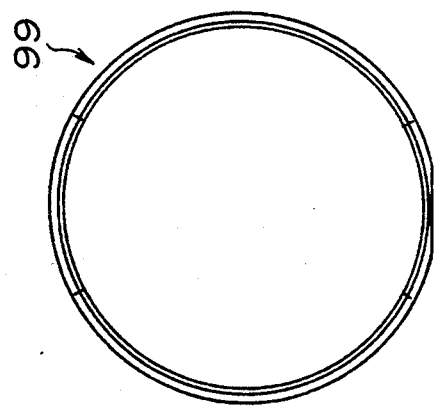
FIG. 20 is a front elevation of a cam ring used in the lens mount device of FIG. 7.
Figure 22:
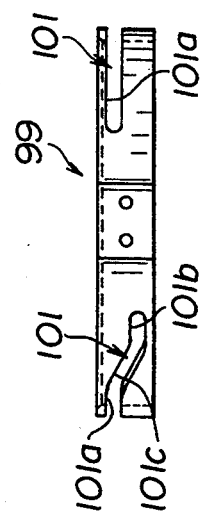
FIG. 22 is a bottom plan view of the cam ring of FIG. 20.

As shown in FIG. 10, a pair of pins 96 and 97 are disposed in diametrically opposed relation on the outer circumferential surface of the slide ring 95. The pins 96 and 97 are fixed to opposed holes 95b and 95c which are disposed on the outer circumferential surface as seen in FIGS. 17–19. The pins 96 and 97 extend through a pair of slots 93 and 94, respectively, which are disposed on the annular wall 90 of the base ring 85 as best shown in FIGS. 15 and 16. As seen in FIGS. 10, 17 and 18, a notch 98 is disposed on a peripheral edge of the slide ring 95 in opposed relation to the groove 92 of the base ring 85.

Figure 23:
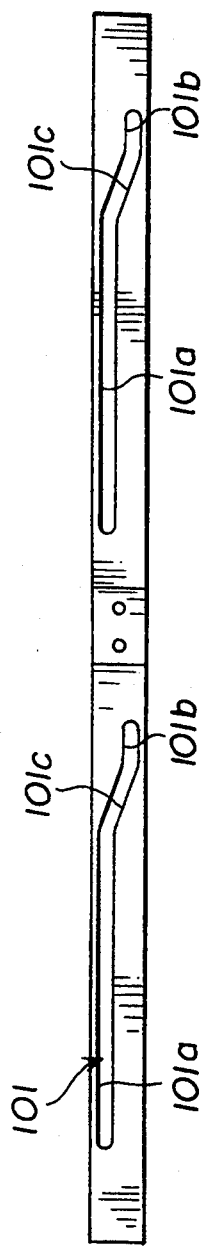
FIG. 23 is a development elevation of the cam ring of FIG. 20.
Figure 28:
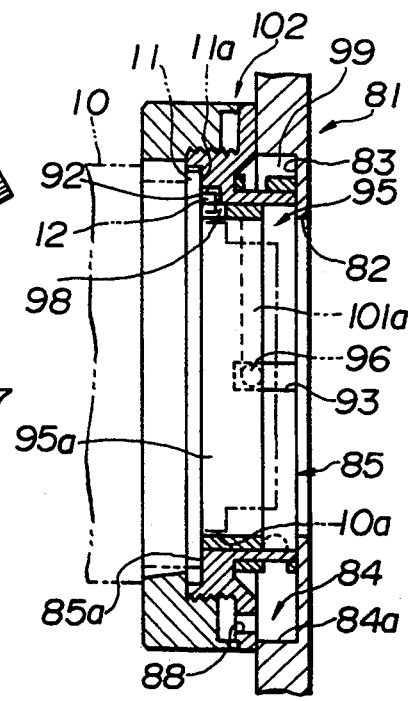
FIG. 28 is a cross-sectional view of the lens mount device of FIG. 27.
Figure 30:
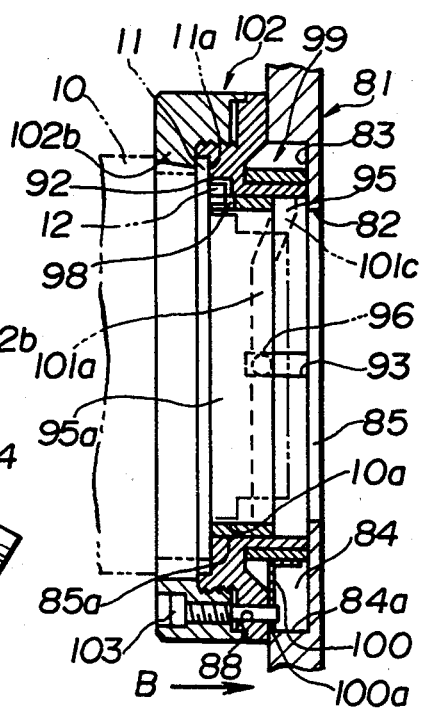
FIG. 30 is a cross-sectional view of the lens mount device of FIG. 29.
Figure 32:
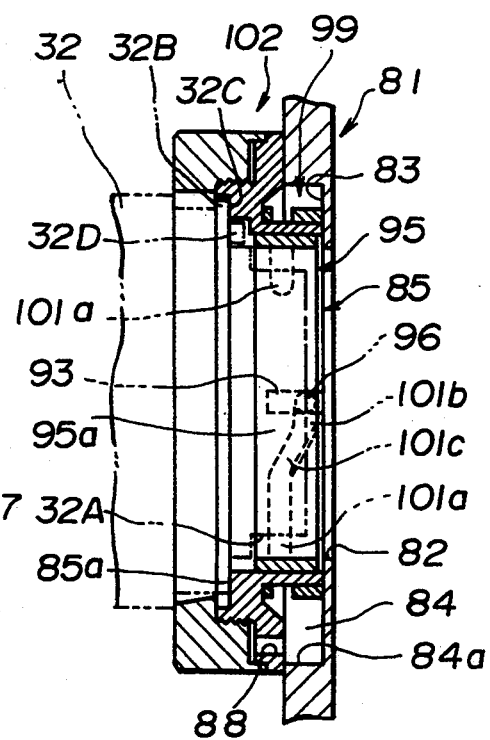
FIG. 32 is a cross-sectional view of the lens mount device of FIG. 31.

Disposed rotatably in the annular groove 89 of the base ring 85 is the cam ring 99 as shown in FIGS. 10 and 20–23. The cam ring 99 has an inner surface which engages the outer circumferential surface of the annular wall 90 of the base ring 85 as seen in FIGS. 28, 30 and 32. As shown in FIGS. 28, 30 and 32, the cam ring 99 has one end contacting the integral flange 83 of the base 81 and the other end contacting the body portion of the base ring 85. Referring back to FIGS. 10 and 21–23, the cam ring 99 is formed with a pair of opposed cam grooves 101 circumferentially formed on its cylindrical body. As best shown in FIG. 23, each of the cam grooves 101 includes a short cam portion 101b disposed adjacent the one end of the cam ring 99, a long cam portion 101a disposed adjacent the other end of the cam ring 99, and a slat junction portion 101c joining the long and short cam portions 101a and 101b. The cam grooves 101 are engaged with the pins 96 and 97 of the slide ring 95, respectively. The pins 96 and 97 acting as cam followers are allowed to move along the cam grooves 101 when the cam ring 99 rotates. As shown in FIGS. 10 and 30, a bracket 100 is fixed on an outer surface of the cam ring 99 and formed with a notch 100a receiving a pin 103.

Figure 24:
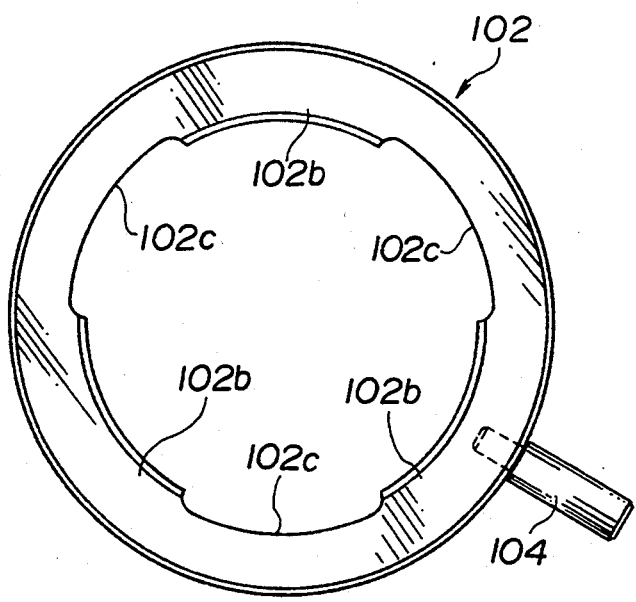
FIG. 24 is a front elevation of an actuator ring used in the lens mount device of FIG. 7.
Figure 25:
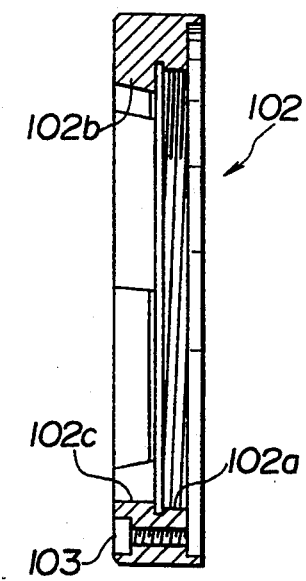
FIG. 25 is a cross-sectional view of the actuator ring of FIG. 24.
Figure 26:
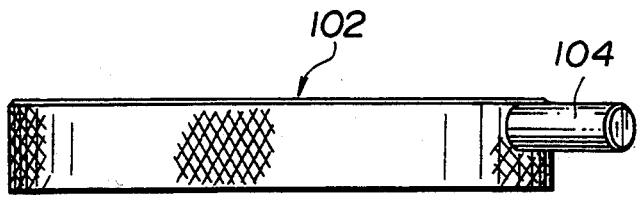
FIG. 26 is a bottom plan view of the actuator ring of FIG. 24.

As best shown in FIG. 30, the pin 103 extends through a hole formed on the actuator ring 102, the arcuate opening 88 of the base ring 85 and the notch 100a of the bracket 100. Thus, the actuator ring 102 is connected with the cam ring 99 by the pin 103. Referring back to FIGS. 10 and 25, the actuator ring 102 is formed with an inner threaded portion 102a on an inner surface thereof which is engaged with the outer threaded portion 85b of the base ring 85. As shown in FIGS. 24 and 26, a lever 104 is attached to an outer surface of the actuator ring 102. The actuator ring 102 is movable rotatably and axially with respect to the axis of the base ring 85 by operating the lever 104. As best shown in FIG. 24, three inwardly protrudent portions 102b are disposed in equidistantly spaced relation on the inner periphery of the actuator ring 102 on the lens mounting side. Each of the inwardly protrudent portions 102b has a tilt face which is inclined with respect to an end face of the actuator ring 102 such that the protrudent portion 102b is tapered inwardly as seen in FIG. 25. The protrudent portion 102b serves for urging the end face 11a of the flange 11 of the mount portion 10 to abut against the end face 85a of the base ring 85, upon mounting the portable size lens 3 as shown in FIG. 30. Referring back to FIGS. 24 and 25, a recess 102c is disposed between the adjacent two of the protrudent portions 102b on the inner surface of the actuator ring 102.

Referring to FIGS. 27-30, a bayonet mounting operation for mounting the portable size lens 3 on the large size video camera body 21, will now be explained.

Figure 27:
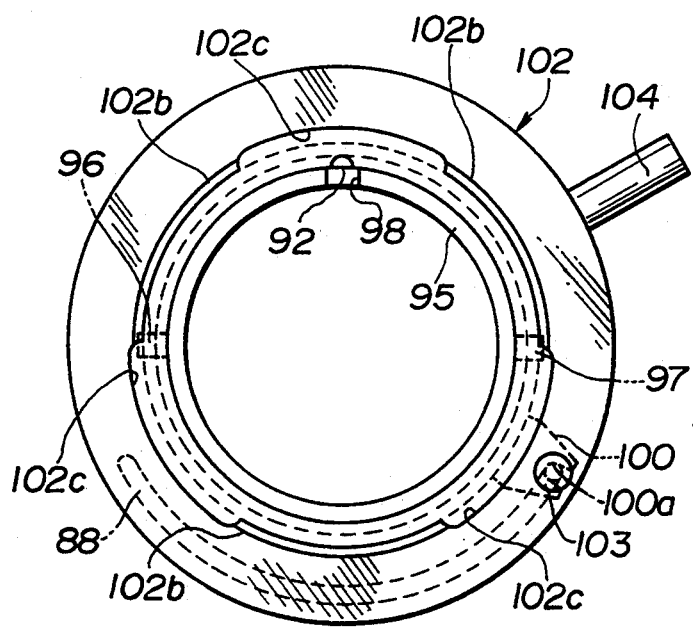
FIG. 27 is a front elevation of an essential part of the lens mount device, which is used for explanation of a bayonet mounting operation with the lens mount device.

As shown in FIGS. 27 and 28, the actuator ring 102 is in an initial position in which the cam ring 99 associated with the actuator ring 102 by the pin 103 allows the pins 96 and 97 of the slide ring 95 to be disposed in a leading end of the long cam portion 101a of the cam groove 101. The slide ring 95 is placed in the first position as seen in FIG. 28. Then, the portable size lens 3 is inserted to the lens mount device 80 in such a manner that the flanges 11 of the mount portion 10 are aligned with the recesses 102c and the pin 12 is fit into the groove 92 of the base ring 85 and the notch 98 of the slide ring 95. In this position, the end face 11a of the flange 11 is engaged with the end face 85a of the base ring 85 such that an optical distance of the portable size lens 3 is adjusted with respect to the large size video camera body 21. Simultaneously, in the first position, the inner circumferential surface 95a of the slide ring 95 is engaged with the outer circumferential surface 10a of the mount portion 10 of the portable size lens 3 so that the optical axis of the portable size lens 3 is accurately aligned with that of the large size video camera body 21.

Figure 29:
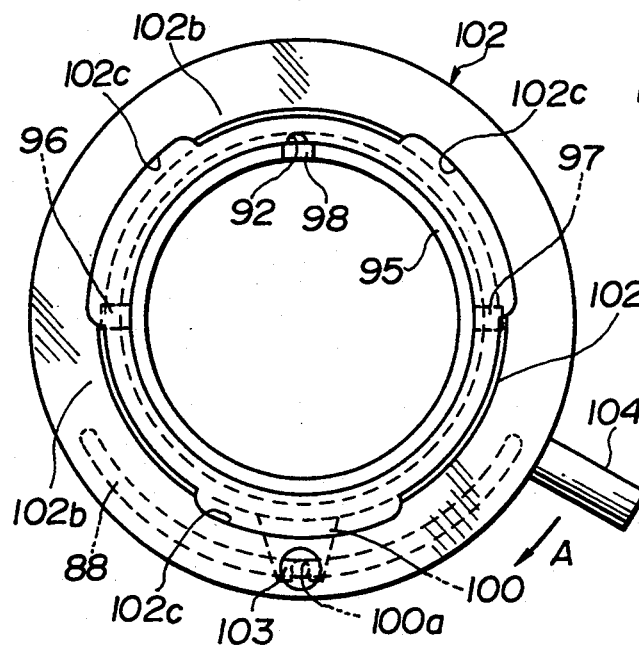
FIG. 29 is a front elevation similar to FIG. 27.

Subsequently, the actuator ring 102 is rotated in a direction as indicated by an arrow A of FIG. 29. The pin 103 on the actuator ring 102 is moved by operation of the lever 104 in the direction A into a mid-portion of the arcuate groove 88 of the base ring 85. The cam ring 99 is also rotated in the direction A and allows the pins 96 and 97 to move from the leading end of the long cam portion 101a toward the slant junction portion 101c of the cam groove 101. The actuator ring 102 is axially moved on the base ring 85 toward the base 81 due to their threaded engagement, viz. in a direction as indicated by an arrow B of FIG. 30, and placed in an axial position as shown in FIG. 30. In this position, the flanges 11 of the portable size lens 3 are retained between the protrudent portions 102b of the actuator ring 102 and the base ring 85 and the protrudent portions 102b urge the end face 11a of the flange 11 against the end face 85a of the base ring 85. The slide ring 95 is kept placed in the first position as seen in FIG. 30.

A dismounting operation of the portable size lens 3 from the large size video camera body 21 is performed by carrying out in reverse the steps of the bayonet mounting operation as described above.

Referring to FIGS. 31-39, a hanger mounting operation of the large size lens 31 on the portable size video camera body 1, will now be explained.

Figure 31:
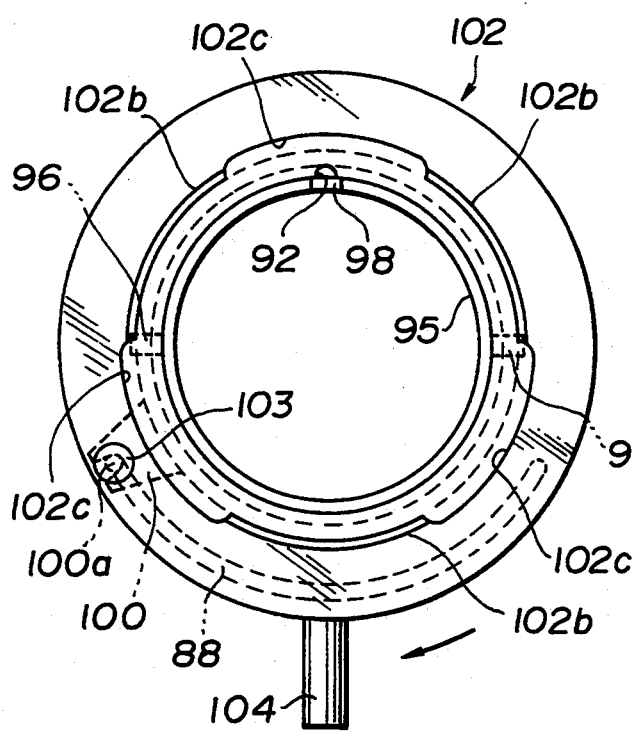
FIG. 31 is a front elevation of the essential part of the lens mount device, which is used for explanation of a hanger mounting operation with the lens mount device.
Figure 33:
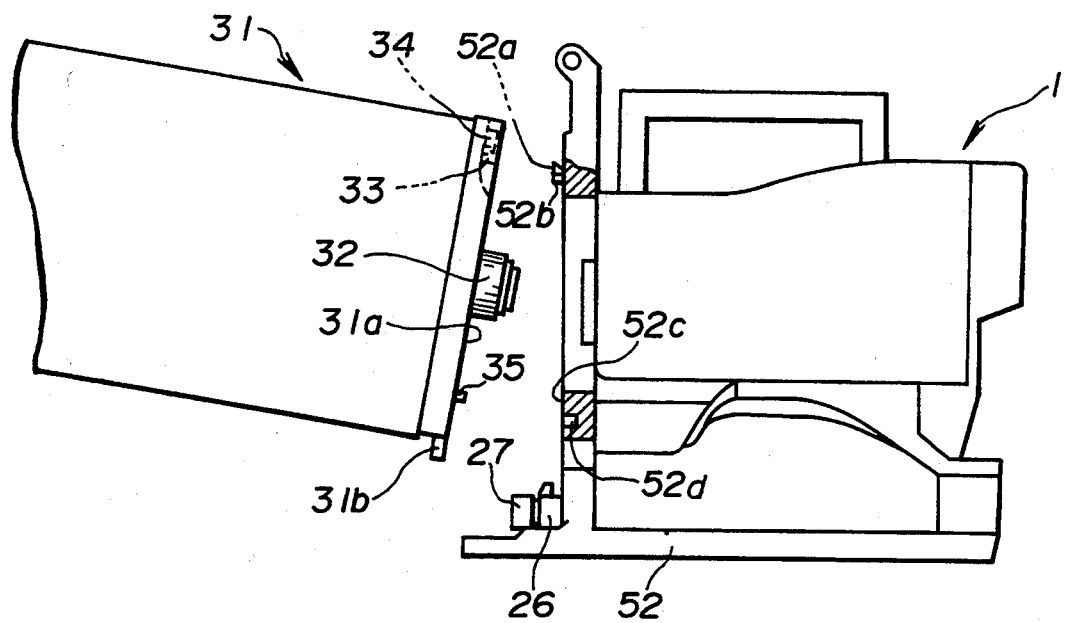
FIGS. 33 and 34 showing the hanger mounting operation of the large size lens on the portable video camera body by using a support.
Figure 34:
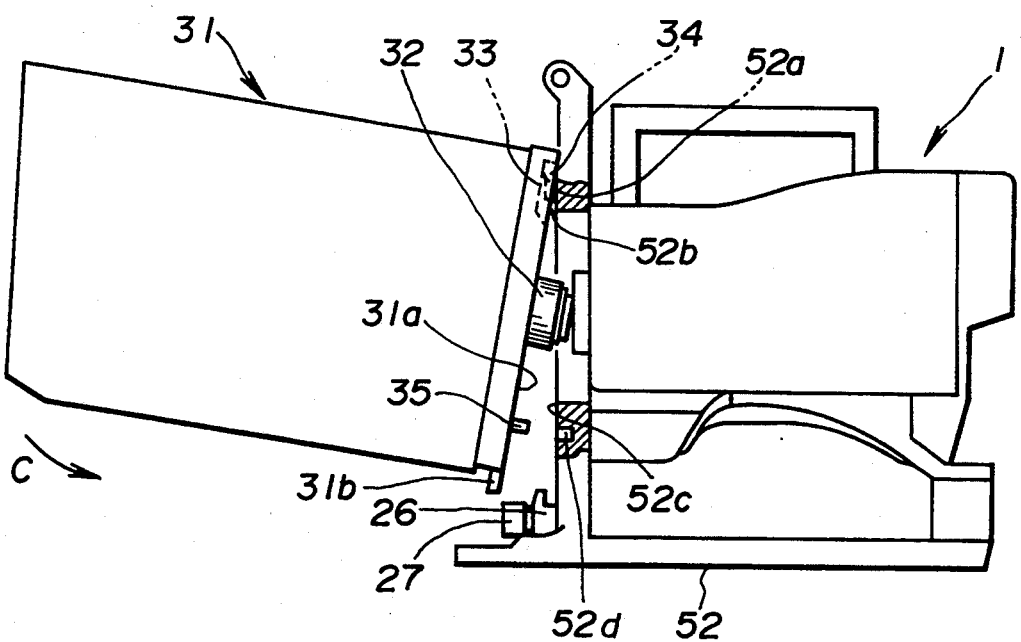
Figure 35:
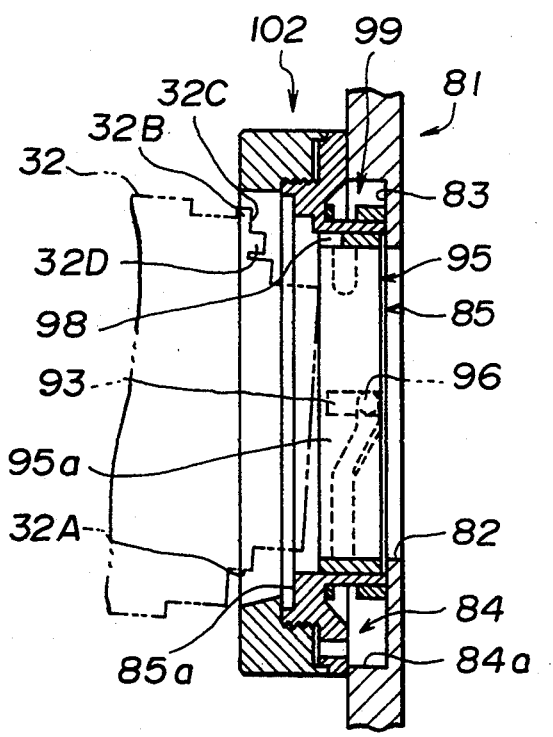
FIGS. 35-39 showing relative positions of the large size lens and the portable video camera body during the hanger mounting operation.
Figure 36:
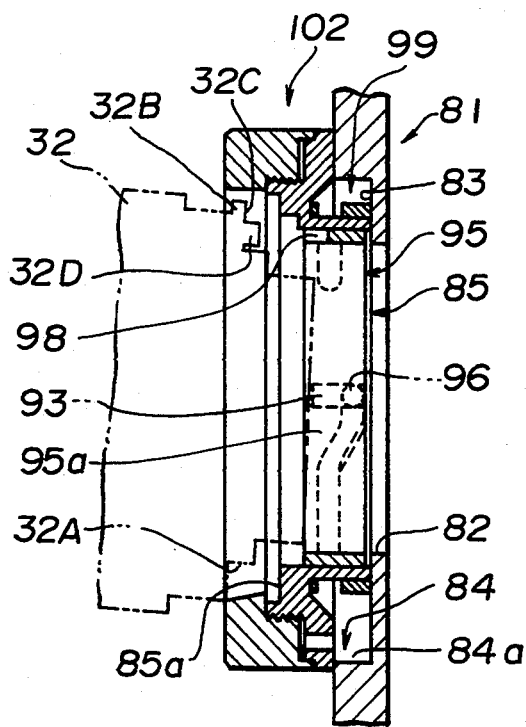
Figure 37:
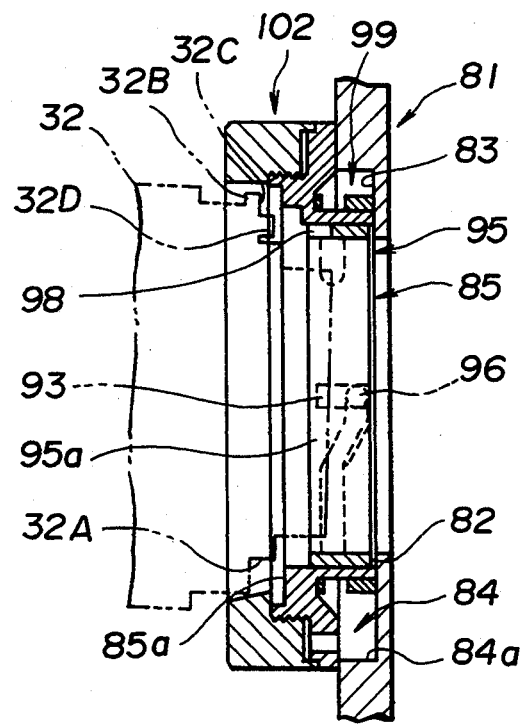
Figure 38:
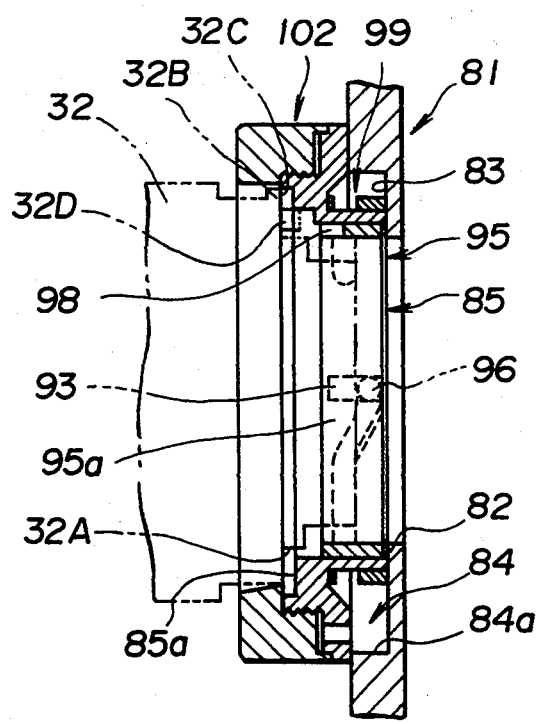
Figure 39:
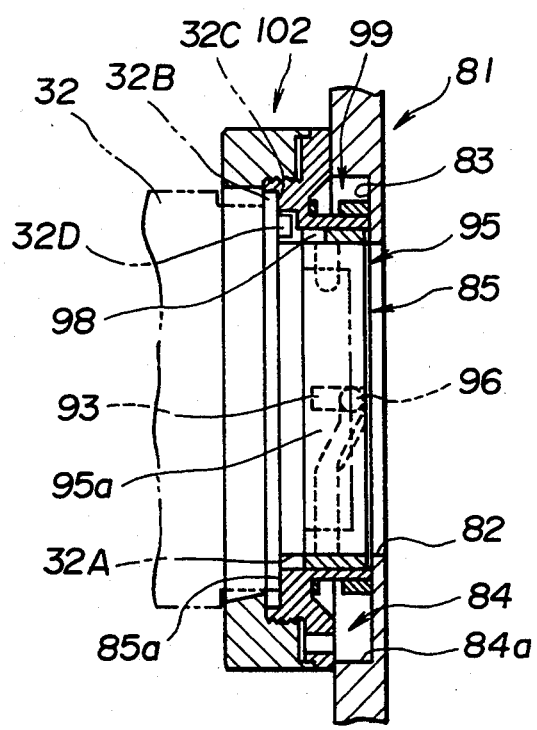

As shown in FIGS. 31 and 32, the actuator ring 102 is rotated clockwise until the lever 104 is moved into a lowermost position as viewed in FIG. 31. Then, the actuator ring 102 is in a terminal position on the side of the base 81 as shown in FIG. 32. The cam ring 99 is associated by the pin 103 with the actuator ring 102 to rotate clockwise. The rotation of the cam ring 99 causes the pins 96 and 97 of the slide ring 95 to move from the long cam portion 101a via the slant junction portion 101c into the short cam portion 101b of the cam groove 101 as seen in FIG. 32. Simultaneously, the pins 96 and 97 are allowed to move axially in the slots 93 and 94 of the base ring 85 toward the base 81. Thus, the slide ring 95 is axially moved close to the integral flange 83 of the base 81 and placed in the second position as shown in FIG. 32 where the inner circumferential surface 95a of the slide ring 95 is disengaged from the outer circumferential surface 32A of the mount portion 32 of the large size lens Subsequently, the portable size video camera body 1 is mounted on a horizontal base wall of a support 52 as shown in FIGS. 33 and 34. The support 52 includes a vertical wall extending uprightly from the horizontal base wall as seen in FIG. 33. The vertical wall has one end face 52c formed with a wedge 52b which projects outward from an upper portion thereof as viewed in FIG. 33 and has a groove 52a thereon. A recess 52d is formed on a lower portion of the end face 52c as shown in FIG. 33. Upon mounting the large size lens 31 on the vertical wall of the support 52, the groove 52a of the wedge 52b receives the pin 33 on the upper portion as viewed in FIG. 84, of the rear wall 31a of the large size lens 31. The large size lens 31 is swung in hanging manner around the connection of the wedge 34 with the wedge 52b in a direction as indicated by an arrow C of FIG. 34. Then, the pin 35 on the lower portion of the rear wall 31a is received in the recess 52d. The wedge 52b is engaged with the wedge 34 of the large size lens 31 so that optical axes of the large size lens 31 and the portable size video camera body 1 are aligned. Thus, the rear wall 31a of the large size lens 31 contacts the end face 52c of the vertical wall of the support 52 in face-to-face relation such that adjustment of an optical distance is accomplished. The adjustment of the optical distance is correctable by a flange-back control mechanism (not shown) which is disposed in the large size lens 31. Then, the operating member 27 on the rotary engaging member 26 is rotated in such a direction that the rotary engaging member 26 is engaged with the engaging member 31b of the large size lens 31.

During this hanger mounting operation of the large size lens 31 on the portable size video camera body 1, the slide ring 95 is kept in the second position where the inner circumferential surface 95a of the slide ring 95 is disengaged from the outer circumferential surface 32A of the mount portion 32 of the large size lens 31, as shown in FIGS. 35-39. Thus, the mount portion 32 of the large size lens 31 is prevented from interference with the slide ring 95 during the hanger mounting operation.

A dismounting operation of the large size lens 31 from the portable size video camera body 1 with the lens mount device 80, is performed by carrying out in reverse the steps of the hanger mounting operation.

Referring to FIGS. 40-53, there is shown a second embodiment of the lens mount device 110 according to the present invention.

Figure 40:
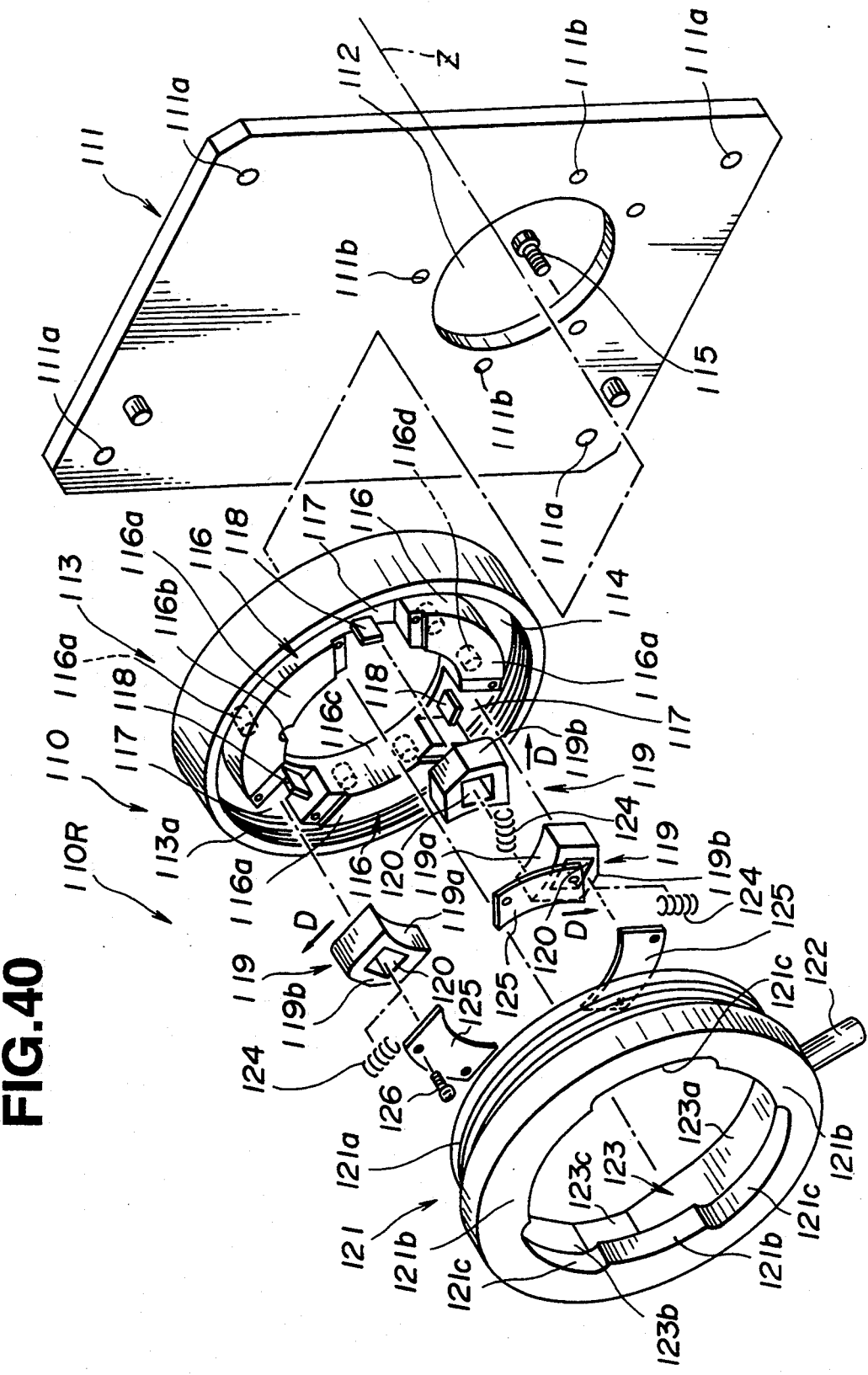
FIG. 40 is an exploded perspective view of a second embodiment of the lens mount device according to the present invention.

As shown in FIG. 40, the lens mount device 110 includes a base 111 which is secured to the portable video camera body 1 or the large size video camera body 21, and a ring assembly 110R disposed on the base 111.

As seen in FIGS. 41 and 42, the base 111 is of a generally rectangular shape and formed with holes 111a at four corners thereof through which screws 'a' extend to fix the base 111 on the camera body. The base 111 has a circular opening 112 having an axis Z aligned with the optical axis of the camera body, as seen in FIG. 40. A plurality of holes 111b are disposed around the opening 112 in spaced relation as seen in FIG. 41.

Referring back to FIG. 40, the ring assembly 110R includes a base ring 113, slide members 119 and an actuator ring 121.

Figure 43:
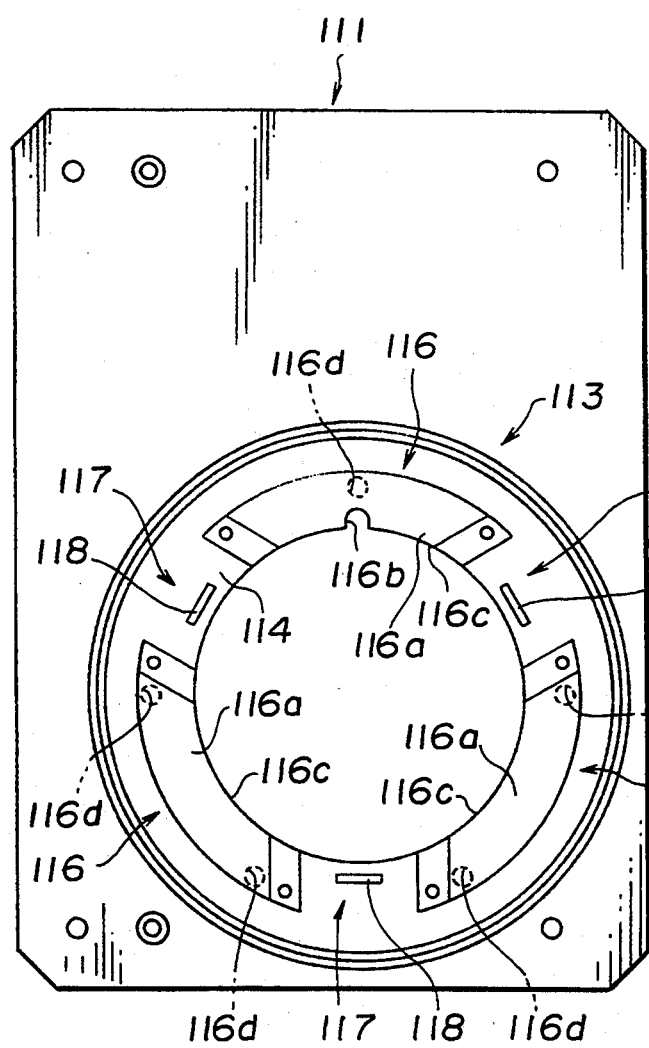
FIG. 43 is a front elevation of a base ring secured to the base of the lens mount device of FIG. 41.
Figure 44:
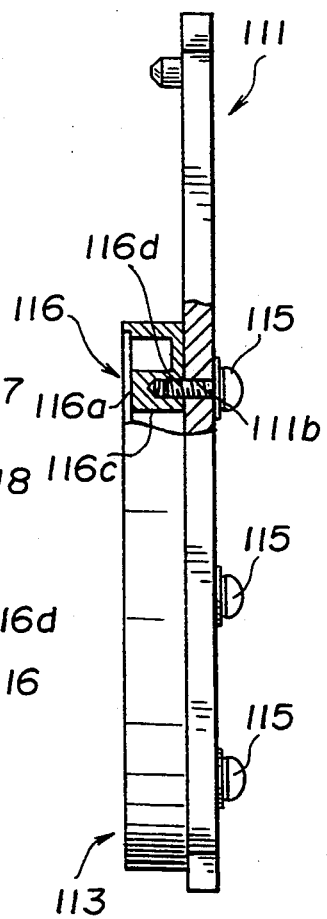
FIG. 44 is a side view, partially broken away, of FIG. 43.
Figure 45:
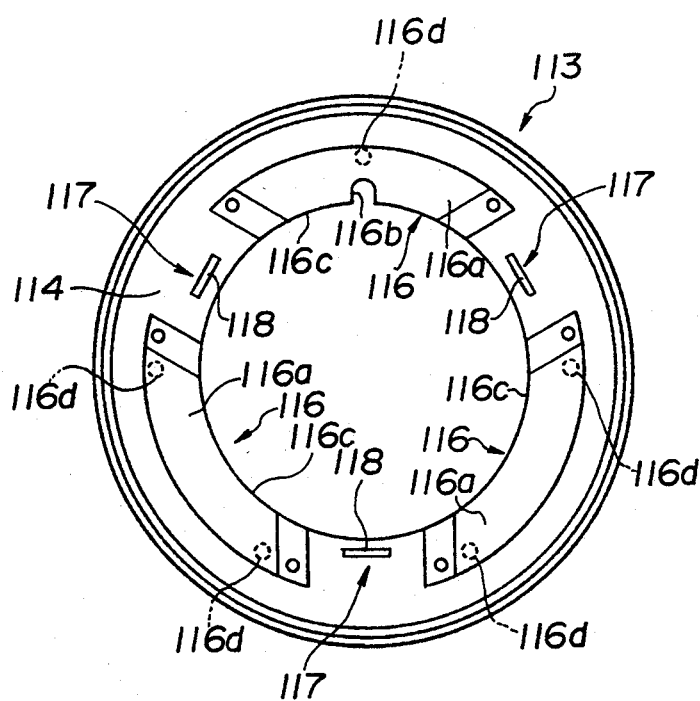
FIG. 45 is a front elevation of the base ring of FIG. 40.
Figure 46:
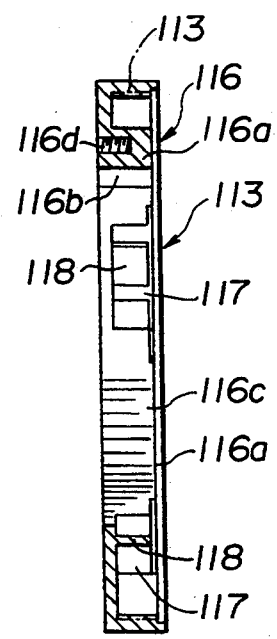
FIG. 46 is a cross-sectional view of the base ring of FIG. 45.

As shown in FIG. 40, the base ring 113 includes a cylindrical body portion having a threaded inner surface 113a. As seen in FIGS. 43 and 45, an integral flange 114 extends radially inward from one end edge of the body portion. The flange 114 defines an inner circular opening which is concentrically disposed with the opening 112 of the base 111. The inner circular opening has a larger diameter than an outer diameter of the small diameter section of the mount portion 10 of the portable size lens 3 or of the mount portion 32 of the large size lens 31. The flange 114 has one end face opposed to a peripheral portion around the opening 112 of the base 111 and the other end face formed with three sectorial portions 116 as best shown in FIG. 40. As seen in FIGS. 40, 43 and 45, the sectorial portions 116 are equidistantly spaced around the inner opening and extend concentrically with the cylindrical body portion with a substantially identical axial length with the body portion. Each of the sectorial portions 116 is formed with an inner surface 116c axially extending from a peripheral edge of the inner opening, as best shown in FIG. 40. One of the sectorial portions 116 disposed uppermost as viewed in FIGS. 43 and 45, is formed with a groove 116b axially extending on the inner surface 116c as best shown in FIG. 46. The groove 116b is engageable with the pin 12 of the mount portion 10 of the portable size lens 3 or the pin 32D of the mount portion 32 of the large size lens 31. Each sectorial portion 116 also is formed with an end face 116a engageable with the end face 11a of the flange 11 which is formed on the mount portion of the portable size lens 3 or the mount portion 32 of the large size lens 31. As seen in FIGS. 40-46, a plurality of holes 116d are disposed through the sectorial portions 116, into which fastening screws 115 are screwed via the holes 111b of the base 111 from the reverse side of the base 111 so that the base ring 113 is secured to the base 111. Disposed between the adjacent two of the three sectorial portions 116 is a recess 117 as best shown in FIGS. 43 and 45.

Figure 48:
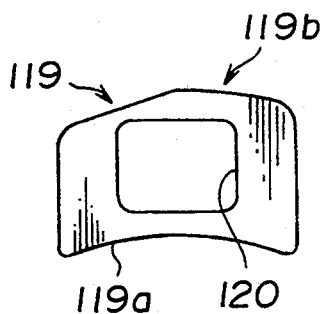
FIG. 48 is a front elevation of a slide member used in the lens mount device of FIG. 40.
Figure 49:
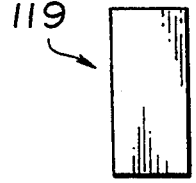
FIG. 49 is a side view of the slide member of FIG. 48.

As shown in FIG. 40, the slide member 119 radially slidable with respect to the axis of the base ring 113 is received in the recess 117 of the base ring 113. As best shown in FIGS. 48 and 49, the slide member 119 is of a generally rectangular shape and formed with an arcuate inner surface 119a which has a smaller radius of curvature than that of the inner surface 116c of the sectorial portion 116 of the base ring 113. The arcuate inner surface 119a is engageable with the outer circumferential surface 10a of the mount portion 10 of the portable size lens 3. The slide member 119 has a first position where the arcuate inner surface 119a is engaged with the outer circumferential surface 10a of the mount portion 10 and a second position where the arcuate inner surface 119a is disengaged from the outer circumferential surface 10a.

Figure 55:
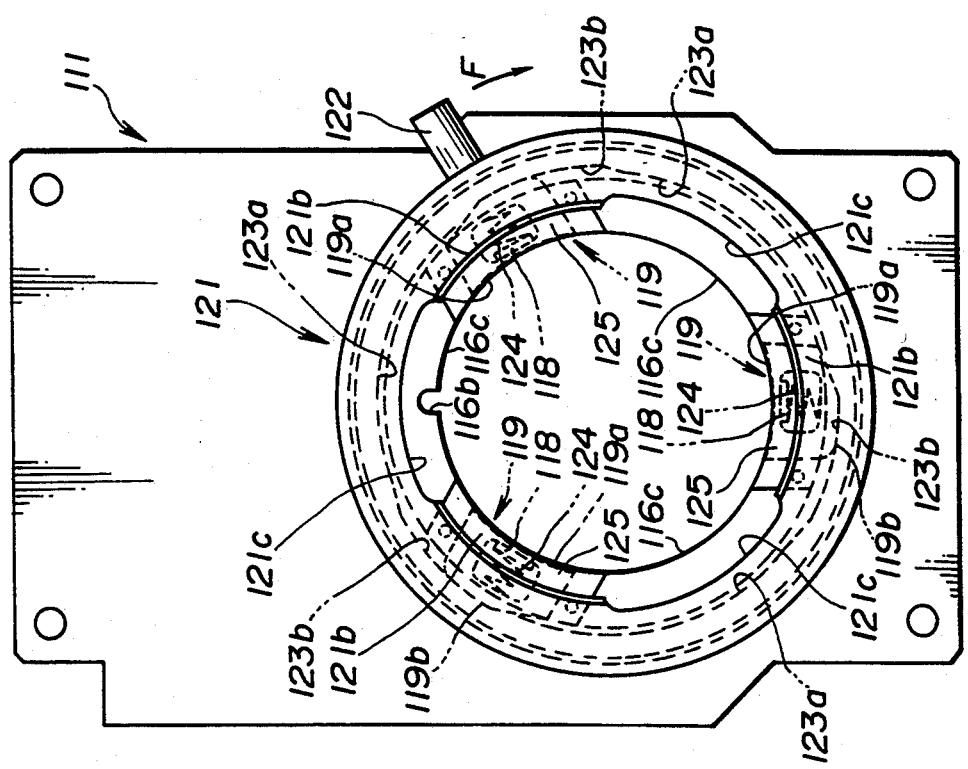
FIG. 55 is a cross-sectional view of the lens mount device of FIG. 54.
Figure 57:
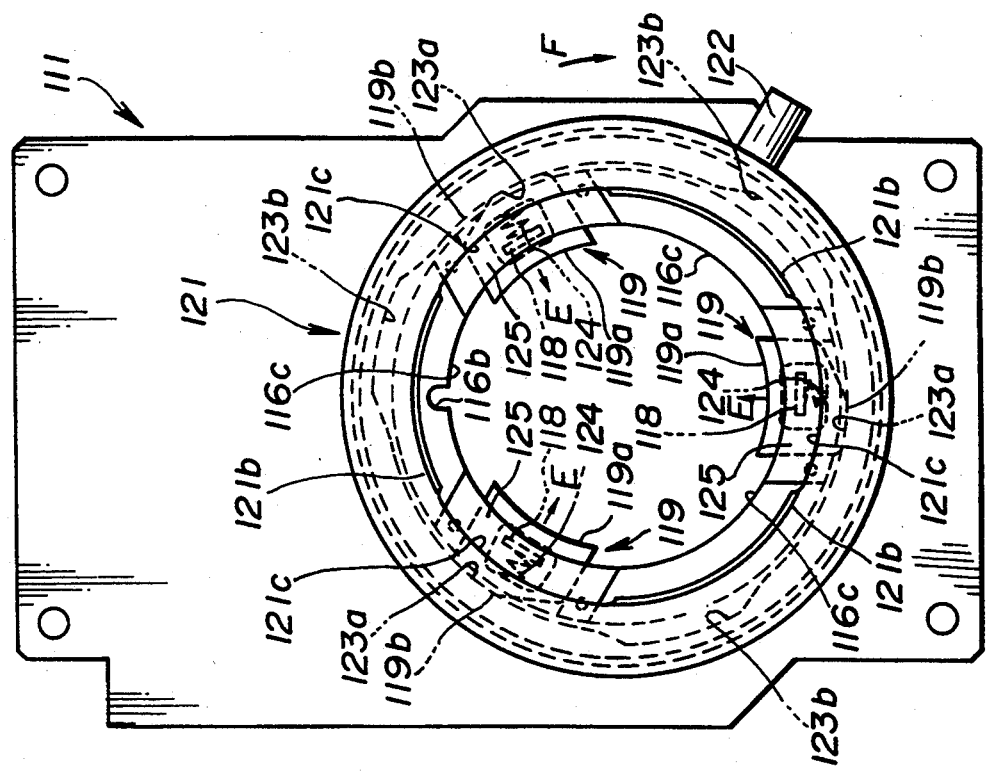
FIG. 57 is a cross-sectional view of the lens mount device of FIG. 56.

As seen in FIGS. 40 and 48, the slide member 119 is formed with a rectangular opening 120 receiving an upright wall 118 which extends axially from the flange 114 of the base ring 113 into and through the recess 117. A coil spring 124 is so arranged in the rectangular opening 120 as to be interposed between an outside face of the upright wall 118 and an inside face of the slide member 119 opposed thereto, as best shown in FIGS. 55 and 57. The coil spring 124 biases the slide member 119 radially outward as indicated by an arrow D of FIG. 40. The slide member 119 has an outer face 119b acting as a cam follower engageable with a cam face 123 of the actuator ring 121 as described below.

Figure 47:
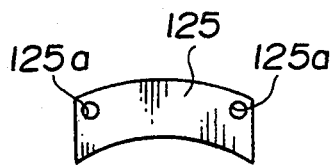
FIG. 47 is a front elevation of a cover plate used in the base ring of FIG. 40.

As shown in FIGS. 40 and 47, a cover plate 125 closing the recess 117 off the base ring 113 is secured at end edges thereof to opposed ends of the adjacent two sectorial portions 116 by screwing a screw 126 into a hole 125a of the cover plate 125.

Figure 50:
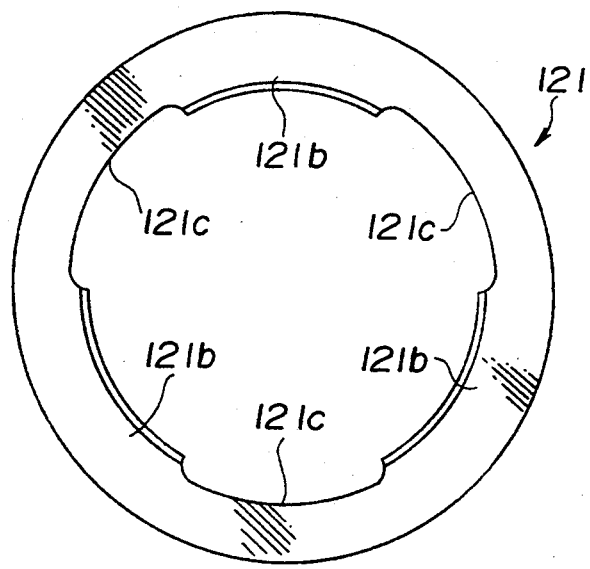
FIG. 50 is a front elevation of an actuator ring used in the lens mount device of FIG. 40.
Figure 51:
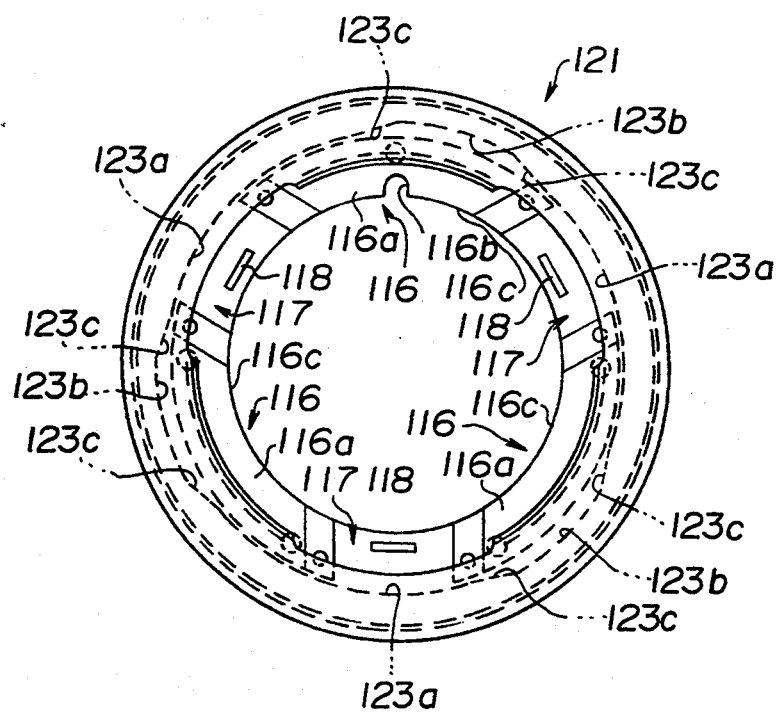
FIG. 51 is a front elevation of the actuator ring coupled with the base ring of FIG. 40.
Figure 53:
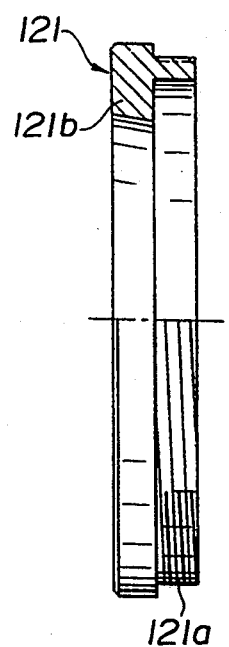
FIG. 53 is a side view, partially in section, of FIG. 52.

Threadedly received in the base ring 113 is the actuator ring 121 as shown in FIG. 40. As seen in FIGS. 40 and 53, the actuator ring 121 has on its outer surface a threaded portion 121a engaged with the threaded inner surface 113a of the base ring 113. As shown in FIG. 40, a lever 122 is attached to the outer surface of the actuator ring 121. The actuator ring 121 is movable rotatably and axially with respect to the axis of the base ring 113 by operating the lever 122. As best shown in FIG. 50, three inwardly protrudent portions 121b are disposed in equidistantly spaced relation on an inner surface of the actuator ring 121 on the lens mounting side. Each of the inwardly protrudent portions 121b has a tilt face which is inclined with respect to an end face of the actuator ring 121 such that the protrudent portion 121b is tapered inwardly as seen in FIG. 53. The protrudent portion 121b serves for urging the end face 11a of the flange 11 of the mount portion 10 to abut against the end face 116a of the sectorial portion 116 of the base ring 113, upon mounting the portable size lens 3 as shown in FIG. 57. Referring back to FIGS. 40 and 50, a recess 121c is disposed between the adjacent two of the protrudent portions 121b of the actuator ring 121.

Figure 52:
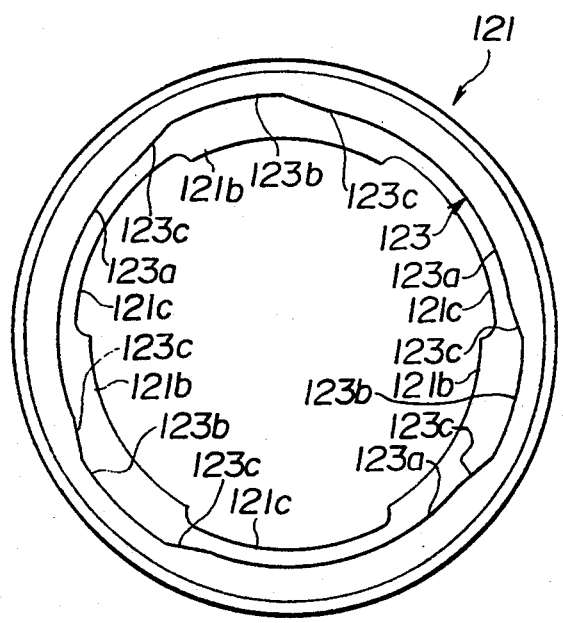
FIG. 52 is a rear elevation of the actuator ring of FIG. 50.

As shown in FIG. 40, the cam face 123 of the actuator ring 121 is formed inward adjacent the protrudent portions 121b and recesses 121c between the adjacent two thereof on the inner surface of the actuator ring 121. As seen in FIGS. 40 and 52, the cam face 123 includes three arcuate portions 123a disposed radially inward and three arcuate portions 123b which are disposed radially outward and have a larger radius of curvature than that of the arcuate portions 123a. As best shown in FIG. 52, the arcuate portions 123a are disposed in equidistantly spaced relation and the arcuate portion 123b is arranged between the adjacent two of the arcuate portions 123a. The arcuate portions 123b have a smaller circumferential distance than the arcuate portions 123a. As seen in FIG. 52, the arcuate portions 123a and 123b are continuously connected through an intermediate portion 123c disposed therebetween. The cam face 123 engages the outer face 119b of the slide member 119 so that the slide member 119 is allowed to move radially into the first and second positions with respect to the axis of the base ring 113.

Referring to FIGS. 54–57, a bayonet mounting operation for mounting the portable size lens 3 on the large size video camera body 21 with the lens mount device 110, will now be explained. In FIGS. 54–57, reference character 'H' denotes an optical system, for example, prism, CCD or the like.

Figure 54:
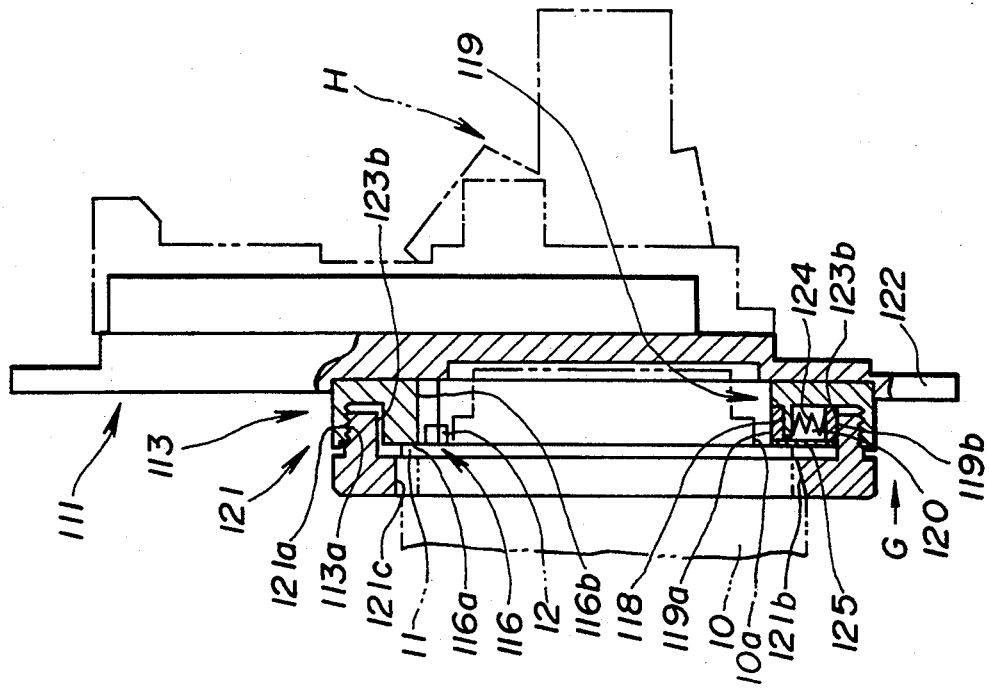
FIG. 54 is a front elevation of the lens mount device of the second embodiment, which is used for explanation of a bayonet mounting operation with the lens mount device.

As shown in FIGS. 54 and 55, the actuator ring 121 is placed in an initial position in which the outer face 119b of the slide member 119 is radially outward biased by the coil spring 124 to be engaged with the radially outward arcuate portion 123b of the cam face 123. The slide member 119 is placed in the second position where the arcuate inner surface 119a is disengaged from the outer circumferential surface 10a of the mount portion 10 of the portable size lens, as seen in FIG. 55. The flanges 11 of the mount portion 10 are fitted to the recesses 121c of the actuator ring 121 and the pin 12 is inserted into the groove 116b of the base ring 113. In this position, the end face 11a of the flange 11 is engaged with the end face 116a of the sectorial portion 116 of the base ring 113 such that adjustment of an optical distance is accomplished.

Figure 56:
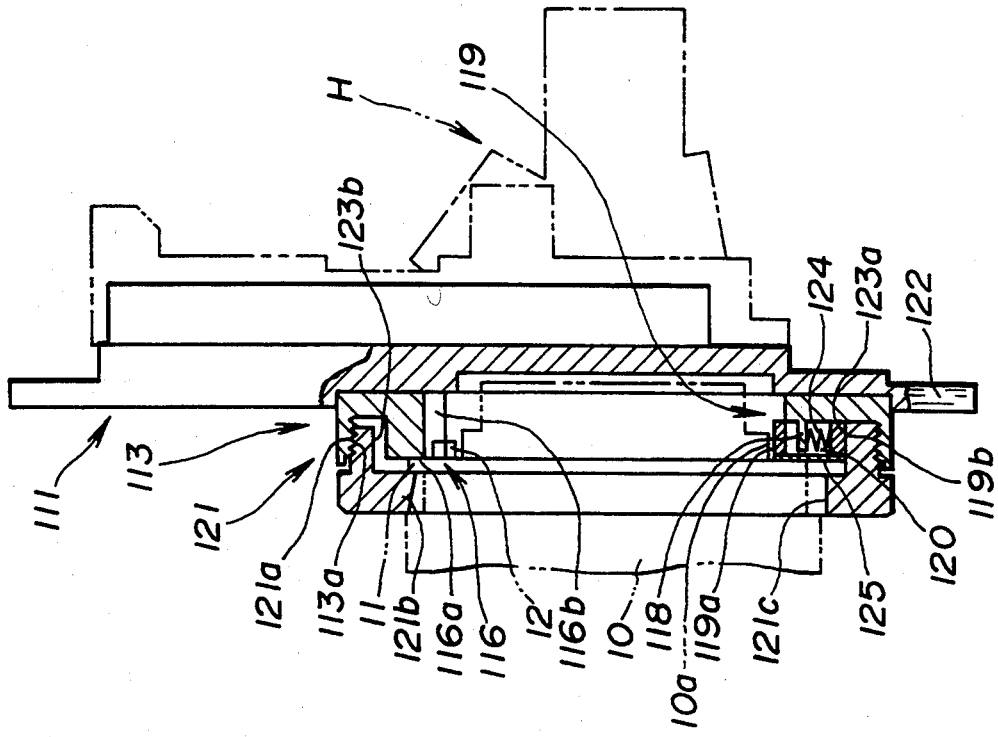
FIG. 56 is a front elevation similar to FIG. 54.

Subsequently, the actuator ring 121 is rotated by the lever 122 in a direction as indicated by an arrow F of FIG. 54, and moved into a position as seen in FIG. 56. Thus, the actuator ring 121 is axially moved toward the base 111, viz. in a direction as indicated by an arrow G of FIG. 55, and placed in an axial position as shown in FIG. 57. In this position as seen in FIG. 57, the inward protrudent portions 121b of the actuator ring 121 urge the end face 11a of the flange 11 of the mount portion 10 against the end face 116a of the base ring 113. Simultaneously, the outer face 119b of the slide member 119 is biased radially inward as indicated by arrows E of FIG. 56, against a force of the coil spring 124, by the radially inward arcuate portion 123a of the cam face 123 of the actuator ring 121. The slide member 119 is placed in the first position where the arcuate inner surface 119a is engaged with the outer circumferential surface 10a of the mount portion 10 of the portable size lens, as seen in FIG. 57. Thus, the optical axis of the portable size lens 3 is aligned with that of the large size video camera body 21.

A dismounting operation of the portable size lens 3 from the large size video camera body 21 with the lens mount device 110 is performed by carrying out in reverse the steps of the bayonet mounting operation as described above.

Figure 59:
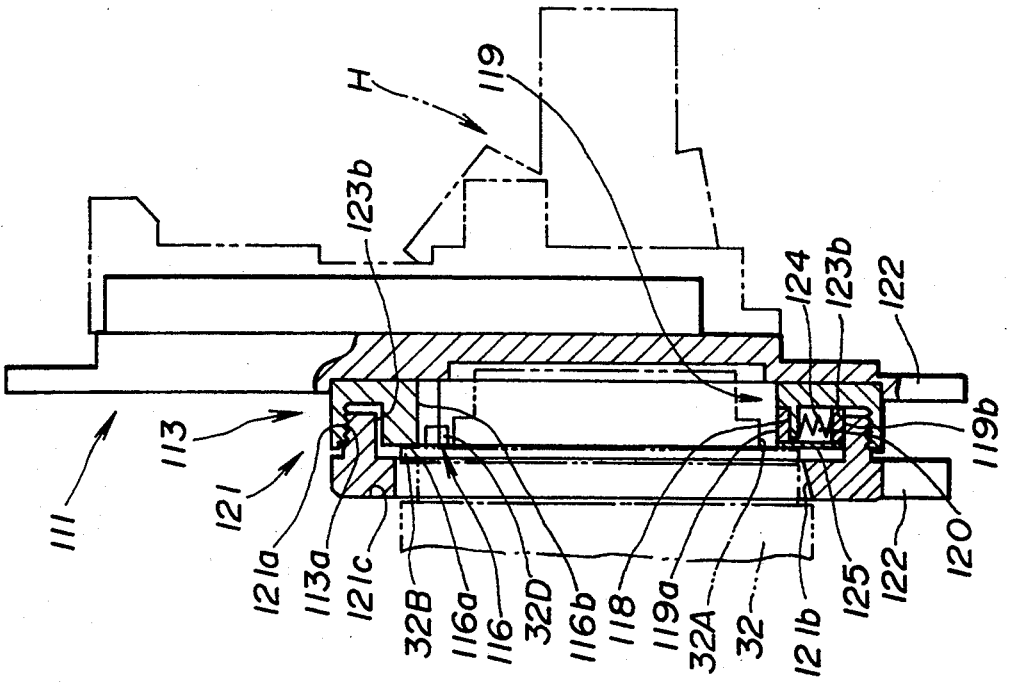
FIG. 59 is a cross-sectional view of the lens mount device of FIG. 58.
Figure 58:
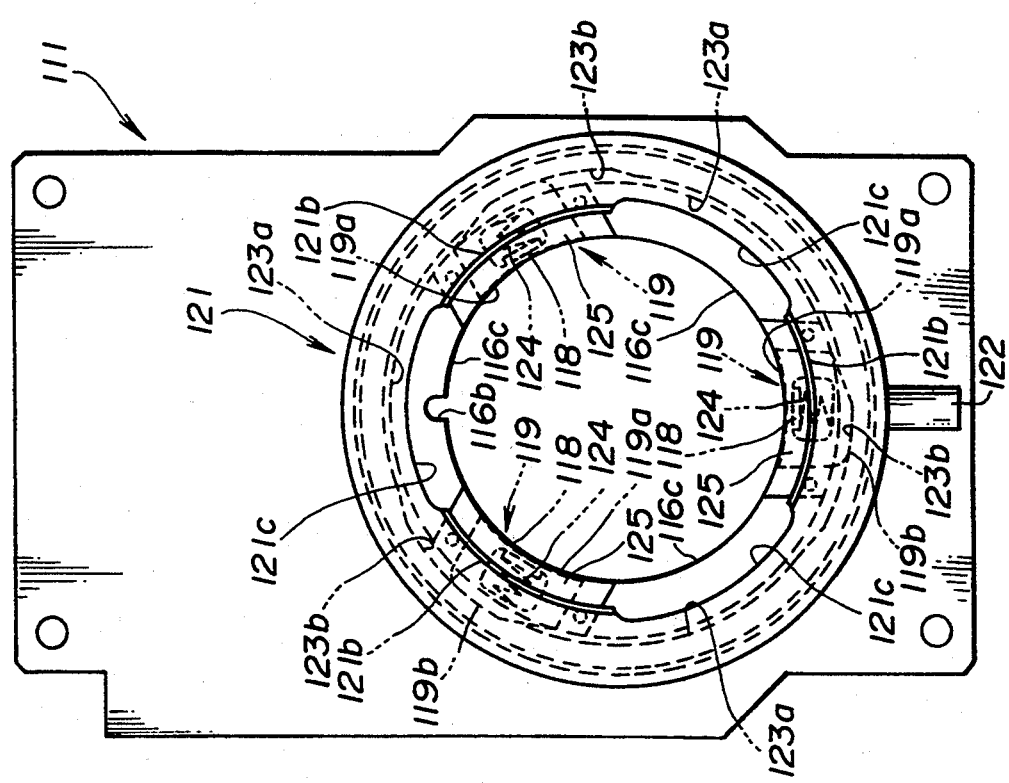
FIG. 58 is a front elevation of the lens mount device of the second embodiment, which is used for explanation of a hanger mounting operation with the lens mount device.

Referring to FIGS. 58 and 59, a hanger mounting operation of the large size lens 81 on the portable video camera body 1 with the lens mount device 110, will now be explained.

As shown in FIG. 58, the actuator ring 121 is rotated clockwise until the lever 122 is moved into a lowermost position. Then, the actuator ring 121 is moved into a terminal position as seen in FIG. 58. The rotation of the actuator ring 121 causes the slide member 119 to be radially moved into the second position as shown in FIG. 59, in which the arcuate inner surface 119a of the slide member 119 is disengaged from the outer circumferential surface 32A of the mount portion 32 of the large size lens. In this position, the outer face 119b of the slide member 119 is engaged with the radially outward arcuate portion 123b of the cam face 123 of the actuator ring 121.

Subsequently, performed is the aforementioned mounting operation of the large size lens 31 on the vertical wall of the support 52 which also supports the portable video camera body 1 on the horizontal base wall as seen in FIGS. 33 and 34. Therefore, detailed explanations thereabout are omitted.

During this hanger mounting operation of the large size lens 31 on the portable video camera body 1, the slide member 119 is kept in the second position as shown in FIG. 59. Thus, the mount portion 32 of the large size lens 31 is prevented from interference with the slide member 119.

A dismounting operation of the large size lens 31 from the portable video camera body 1 with the lens mount device 110, is performed by carrying out in reverse the steps of the hanger mounting operation.

Referring to FIGS. 60–68, there is shown a modified lens mount device 180 which differs in provision of an actuator ring 131 and a check member 141 from the aforementioned first embodiment of the lens mount device 80 according to the invention. Like numerals denote like parts and therefore the detailed descriptions thereabout are omitted.

Figure 60:
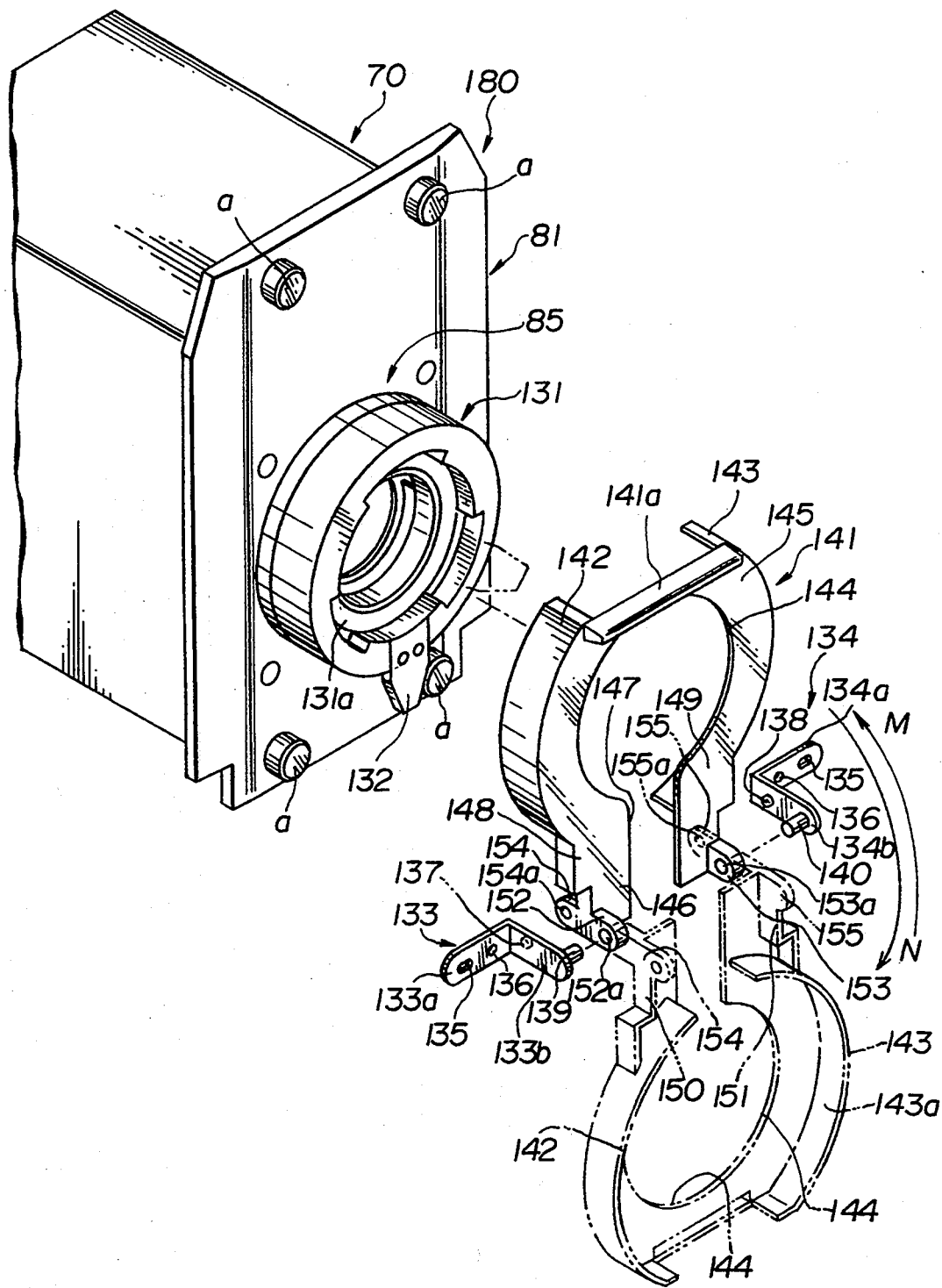
FIGS. 60-68 showing a modified lens mount device according to the present invention, which includes a check member for detecting a rotational position of the actuator ring where the bayonet mounting operation or the hanger mounting operation is performed.
Figure 64:
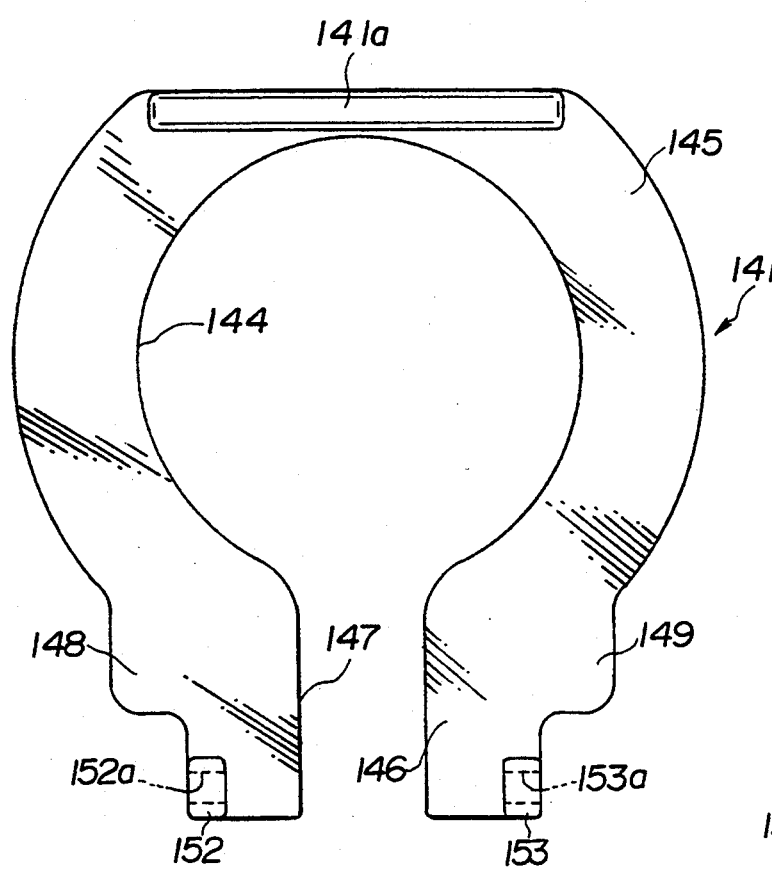
Figure 65:
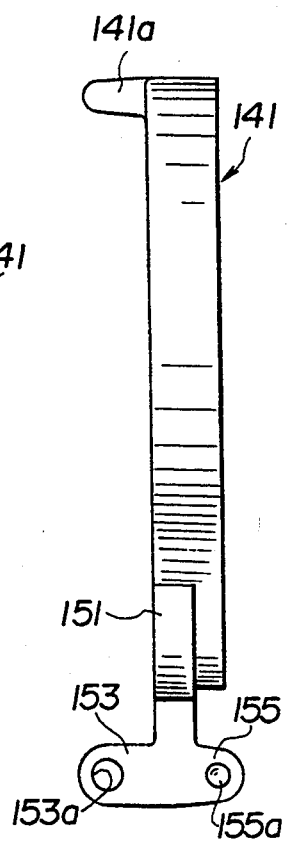
Figure 66:
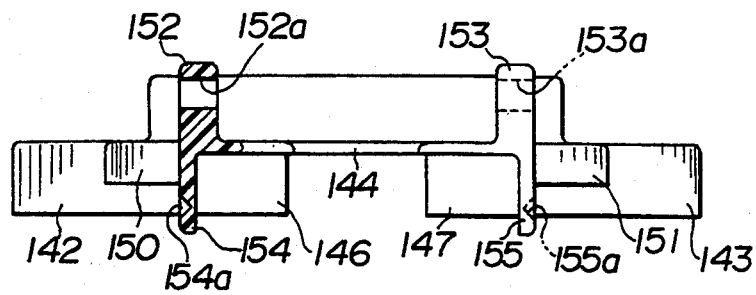
Figure 67:
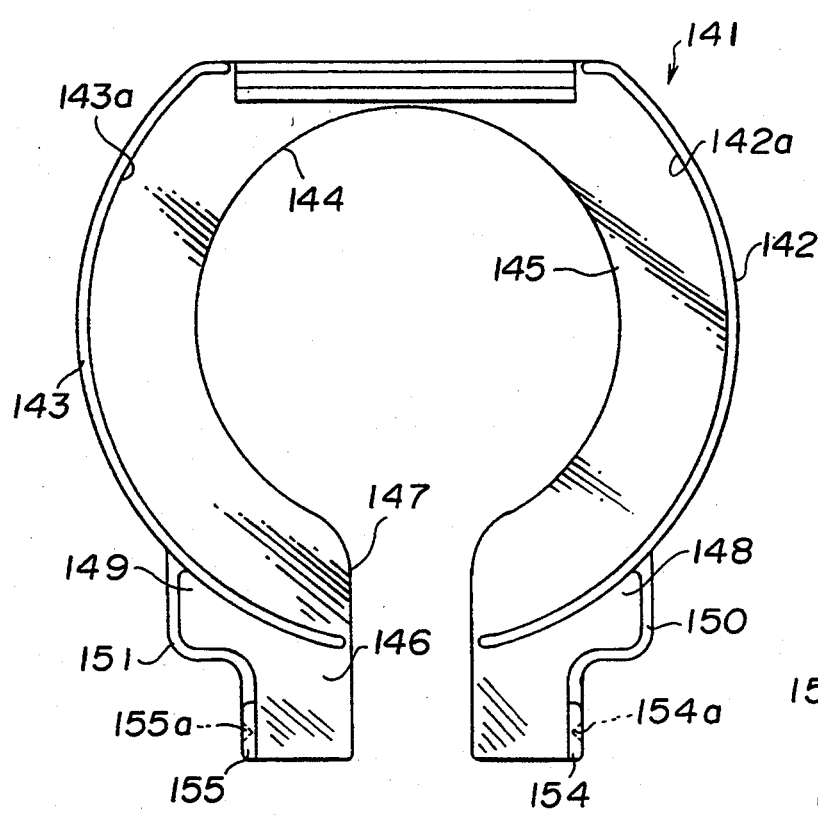
Figure 68:
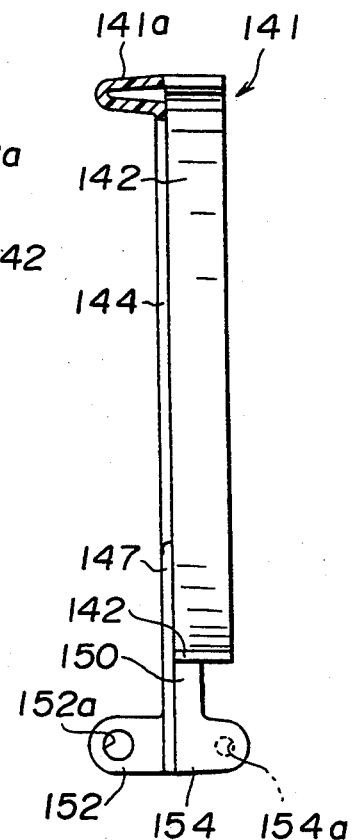

As shown in FIG. 60, the actuator ring 131 is similar to the actuator ring 102 of the first embodiment except a lever 132 projecting radially outward from an outer surface of the actuator ring 131. The actuator ring 131 is engageable with the check member 141 pivotally supported by a pair of fastening members 133 and 134 which are secured to the portable video camera body 1 or the large size video camera body 21. The check member 141 is made of resilient material such as synthetic resin. As shown in FIGS. 60, 64 and 67, the check member 141 includes a generally annular wall 145 formed with a circular opening 144 which has a larger diameter than that off a circular opening 131a of the actuator ring 131. As seen in FIGS. 60, 64, 65 and 68, the generally annular wall 145 is formed with a tab portion 141a extending laterally between its upper left and right peripheral portions as viewed in FIG. 64, and uprightly from one end face thereof. As best shown in FIG. 64, the generally annular wall 145 is formed with a neck portion 146 extending radially outward, downward as viewed in FIG. 64. The neck portion 146 is formed with a notch 147 which communicates with the opening 144 and is engageable with the lever 132 of the actuator ring 131. The notch 147 divides the neck portion 146 into opposed outward protrudent portions 148 and 149 as best shown in FIG. 64. The outward protrudent portions 148 and 149 are opposed to the screws 'a' disposed on the lower portion of the base 81, as seen in FIG. 60. The protrudent portions 148 and 149 serve for detecting insufficient screwing of the screws 'a' into the base 81.

As seen in FIGS. 60 and 67, a pair of opposed side walls 142 and 143 extend uprightly from the other end face of the annular wall 145 along a peripheral outer edge thereof. The side walls 142 and 143 have arcuate inner surface 142a and 143a engageable with the outer surface of the actuator ring 131, respectively. The side walls 142 and 143 are respectively connected with a pair of upright walls 150 and 151 extending uprightly from outer peripheral edges of the protrudent portions 148 and 149, as seen in FIGS. 65–68.

As shown in FIGS. 60, 64–66 and 68, a pair of integral pivot arms 152 and 153 are formed on one end face of the opposed protrudent portions 148 and 149 of the neck portion 146. The integral pivot arms 152 and 153 are formed with holes 152a and 153a, respectively. A pair of integral pin brackets 154 and 155 are formed on the other end face of the protrudent portions 148 and 149, as seen in FIGS. 60 and 65–68. The integral pin brackets 154 and 155 are respectively formed with grooves 154a and 155a engageable with semi-spherical pins 137 and 138 of a pair of L-shaped brackets 133 and 134 as shown in FIGS. 60–63.

Figure 61:
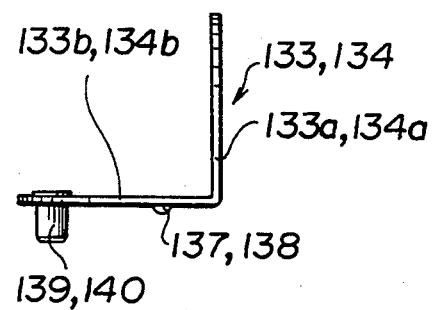
Figure 62:
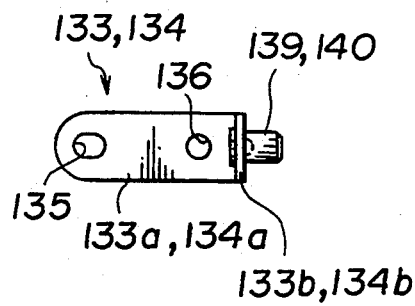
Figure 63:
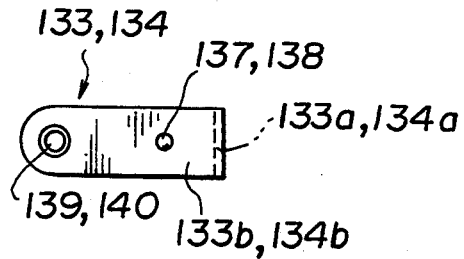

The L-shaped brackets 133 and 134 are secured to a lower portion of a front face of the camera body in spaced relation by means of screws (not shown). As shown in FIGS. 61 and 62, the L-shaped brackets 133 and 134 include base portions 133a and 134a which are secured to the front face of the camera body and formed with holes 135 and 136 for fastening screws. As seen in FIGS. 61 and 63, upright portions 133b and 134b extend uprightly from the base portions 133a and 134a and are formed with the semi-spherical pins 137 and 138. Pivot pins 139 and 140 are fixed on the upright portions 133b and 134b in opposed relation as best shown in FIG. 60. The pivot pins 139 and 140 are fit into the holes 152a and 153a of the integral pivot arms 152 and 153. Thus, the pivot arms 152 and 153 are pivotally supported around the pivot pins 139 and 140.

When the actuator ring 131 is rotated such that the lever 132 is moved into a position as indicated in a phantom line in FIG. 60, the actuator ring 131 is prevented from engaging with the check member 141 by abutting of the lever 132 against the side wall 143 even though the check member 141 is rotated around the pivot pins 139 and 140 of the pivot arms 152 and 153 in a direction as indicated by an arrow hi of FIG. 60. Therefore, the check member 141 is rotated in a direction as indicated by an arrow N of FIG. 60 to be placed in a position as indicated in a phantom line. In this condition, the mount portion 10 of the portable size lens 3 is mountable on the large size video camera body 21 by the bayonet mounting operation.

When the actuator ring 131 is rotated until the ever 132 is moved into a position as indicated in a solid line in FIG. 60, the lever 132 is engaged with the notch 147 of the check member 141 by rotating the check member 141 around the pivot pins 139 and 140 in the direction M as seen in FIG. 60. This engagement of the lever 132 with the notch 147 is allowed by engaging the pins 137 and 138 off the L-shaped brackets 133 and 134 with the grooves 154a and 155a of the pin brackets 154 and 155 during rotation of the check member 141. Upon the engagement of the pins 137 and 138 with the grooves 154a and 155a, the opposed protrudent portions 148 and 149 of the check member 141 are elastically deformed to reduce the notch 147, viz. a distance between the opposed protrudent portions 148 and 149. Thus, the actuator ring 131 is allowed to be engaged with the check member 141. In this condition, the mount portion 32 of the large size lens 31 is mountable on the portable video camera body 1 by the hanger mounting operation.

The provision of the check lever 141 serves for noticing the rotational position of the actuator ring 131 in which the bayonet mounting operation of the portable size lens or the hanger mounting operation of the large size lens can be performed.

The actuator ring 131 and the check member 141 of the modified lens mount device 180 may be applied to the first and second embodiments of the lens mount device.

As is apparent from the above description, the lens mount device according to the present invention may be applied to another type of optical apparatus.

What is claimed is:

1. A lens mount device for detachably mounting a lens cylinder on optical apparatus which has an optical axis passing therethrough, said lens cylinder having a cylindrical outer surface, comprising:
   a base plate having a circular opening having an axis aligned with said optical axis;
   a base ring secured to said base plate and formed with a cylindrical opening coaxial with said circular opening of said base plate to receive said lens cylinder;
   a movable member movably disposed within said base ring and formed with an inner surface, said movable member having a first position where said inner surface of said movable member is engaged with said outer surface of said lens cylinder and a second position where said inner surface of said movable member is disengaged from said outer surface of said lens cylinder, when said lens cylinder is mounted on said base ring, said movable member having a cam follower thereon;
   a cam member engageable with said cam follower; and
   an actuator ring rotatably disposed on said base ring and axially movable with respect to said optical axis, said actuator ring being connected with said cam member, the rotating and axial movement of said actuator ring causing said movable member to move into said first and second positions in association with said cam member.

2. A lens mount device as claimed in claim 1, wherein said base ring and said lens cylinder have end faces extending normally with respect to said optical axis, respectively, said end faces being engaged with each other by axial movement of said actuator ring.

3. A lens mount device as claimed in claim 1, wherein said movable member is axially movable with respect to said optical axis.

4. A lens mount device as claimed in claim 1, wherein said movable member is radially movable with respect to said optical axis.

5. A lens mount device as claimed in claim 1, wherein said cam member includes a groove disposed on an outer surface of said movable member.

6. A lens mount device as claimed in claim 5, wherein said cam follower includes a pin secured to an outer surface of said movable member.

7. A lens mount device as claimed in claim 4, wherein said cam member includes a cam face formed on an inner surface of said actuator ring.

8. A lens mount device as claimed in claim 7, wherein said cam follower includes an outer surface of said movable member.

9. A lens mount device for mounting a lens cylinder thereon by selectively performing a hanger mounting operation and a bayonet mounting operation, said hanger mounting operation being performed by engagement of a first wedge disposed on said lens mount device with a second wedge disposed on said lens cylinder and by engagement of a first mount vertical face disposed on said lens mount device with a second mount vertical face disposed on said lens cylinder, said bayonet mounting operation being performed by engagement of a first mount circumferential surface disposed on said lens cylinder with a second mount circumferential surface disposed on said lens mount device and by engagement of a first radial flange disposed on said lens cylinder with said lens mount device, said lens mount device comprising:

a base ring;

a slide ring formed with an inner circumferential surface acting as said second mount circumferential surface, said slide ring having a first position where said slide ring is spaced apart-most from said lens cylinder and a second position where said slide ring is closest to said lens cylinder; and a driving member moving said slide ring along an optical axis into said first and second positions;

wherein said first mount circumferential surface is disengaged from said second mount circumferential surface in said first position during said hanger mounting operation, and said first mount circumferential surface is engaged with said second mount circumferential surface in said second position during said bayonet mounting operation.

10. A lens mount device as claimed in claim 9, further comprising an actuator ring rotatably disposed on said base ring and formed with a third radial flange, said first radial flange of said lens cylinder being interposed between said third radial flange of said actuator ring and a second radial flange disposed on said base ring, said first radial flange of said lens cylinder being engaged at opposed end faces thereof with said third radial flange of said actuator ring and said second radial flange of said base ring by rotation of said actuator ring.

11. A lens mount device as claimed in claim 10, wherein said driving member moves said slide ring in response to rotation of said actuator ring.

12. A lens mount device as claimed in claim 11, wherein said driving member includes a cam ring formed with a cam groove on its side face, a pin fixed to said slide ring and engaged with said cam groove, and a joint member connecting said actuator ring with said cam ring for rotation of said cam ring in association with said actuator ring.

13. A lens mount device as claimed in claim 12, wherein said cam groove is disposed normally with respect to optical axis, said cam groove including first and second long portions axially offset from each other, and a third portion connecting said first and second long portions, said cam groove serving for gradually moving said slide ring during rotation of said actuator ring.

14. A lens mount device as claimed in claim 13, wherein one of said first and second long portions of said cam groove is disposed closer to said lens cylinder and has a longer length than that of the other thereof.

15. A lens mount device for mounting a lens cylinder thereon by selectively performing a hanger mounting operation and a bayonet mounting operation, said hanger mounting operation being performed by engagement of a first wedge disposed on said lens mount device with a second wedge disposed on said lens cylinder and by engagement of a first mount vertical face disposed on said lens mount device with a second mount vertical face disposed on said lens cylinder, said bayonet mounting operation being performed by engagement of a first diameter section formed on said lens cylinder with a second diameter section formed on said lens mount device and by engagement of a first radial flange disposed on said lens cylinder with said lens mount device, said lens mount device comprising:

a base ring formed with a cylindrical opening having a larger diameter than that of said second diameter section, said base ring having on its inner circumferential surface a circular protrudent portion which is formed with a plurality of recesses;

a plurality of slide blocks received in said recesses and formed with annular inner surfaces, said slide blocks having a first position where said annular inner surfaces cooperate with said inner circumferential surface of said base ring to form a common surface, and a second position where said annular inner surfaces of said slide blocks are disposed radially inward beyond said inner circumferential surface off said base ring; and a driving member radially moving said slide blocks into said first and second positions within said base ring;

wherein said first diameter section is disengaged from said second diameter section in said first position during said hanger mounting operation, and said first diameter section is engaged with said second diameter section in said second position during said bayonet mounting operation.

16. A lens mount device as claimed in claim 15, further comprising an actuator ring rotatably disposed on said base ring and formed with a third radial flange, said first radial flange of said lens cylinder being interposed between said third radial flange of said actuator ring and n second radial flange disposed on said base ring, said first radial flange of said lens cylinder being engaged at opposed end faces thereof with said third radial flange of said actuator ring and said second radial flange of said base ring by rotation of said actuator ring.

17. A lens mount device as claimed in claim 15, wherein said driving member moves said slide blocks in response to rotation of said actuator ring.

18. A lens mount device as claimed in claim 17, wherein said driving member includes a cam face formed on an inner circumferential surface of said actuator ring, an engaging surface engaged with said inner circumferential surface of said actuator ring, and biasing means for urging said slide blocks in a radially outward direction with respect to said base ring.

19. A lens mount device as claimed in claim 18, wherein said cam face includes a first arcuate surface having a first radius of curvature, a second arcuate surface having a second radius of curvature larger than said first radius of curvature, and a third surface connecting said first and second arcuate surfaces, said cam face allowing said slide blocks to move gradually radially during rotation of said actuator ring.

20. A lens mount device as claimed in claim 19, wherein said first arcuate surface has a longer distance than that of said second arcuate surface in one direction.

* * * * *